(12) United States Patent
Itoh et al.

(10) Patent No.: US 7,796,192 B2
(45) Date of Patent: *Sep. 14, 2010

(54) IMAGE PROCESSING SYSTEM AND METHOD, AND IMAGE DISPLAY SYSTEM

(75) Inventors: Goh Itoh, Yokohama (JP); Haruhiko Okumura, Fujisawa (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 654 days.

This patent is subject to a terminal disclaimer.

(21) Appl. No.: 11/761,903

(22) Filed: Jun. 12, 2007

(65) Prior Publication Data

US 2007/0236603 A1 Oct. 11, 2007

Related U.S. Application Data

(62) Division of application No. 10/970,413, filed on Oct. 22, 2004, now Pat. No. 7,256,836, which is a division of application No. 09/885,138, filed on Jun. 21, 2001, now Pat. No. 6,836,293.

(30) Foreign Application Priority Data

Jun. 23, 2000 (JP) ............................. 2000-189479

(51) Int. Cl.
*H04N 11/20* (2006.01)
*H04N 7/01* (2006.01)

(52) U.S. Cl. ...................... 348/452; 348/448; 348/443; 348/451

(58) Field of Classification Search ......... 348/451–452, 348/441, 447–448, 459, 443, 558, 620; H04N 11/20, H04N 7/01

See application file for complete search history.

(56) References Cited

U.S. PATENT DOCUMENTS

| 5,249,037 A | 9/1993 | Sugiyama et al. |
| 5,428,397 A | 6/1995 | Lee et al. |
| 5,859,660 A * | 1/1999 | Perkins et al. ............... 725/32 |
| 5,936,676 A | 8/1999 | Ledinh et al. |
| 6,222,589 B1 | 4/2001 | Faroudja et al. |
| 6,483,545 B1 | 11/2002 | Kondo et al. |

(Continued)

FOREIGN PATENT DOCUMENTS

JP    4-302289    10/1992

(Continued)

*Primary Examiner*—Trang U Tran
(74) *Attorney, Agent, or Firm*—Oblon, Spivak, McClelland, Maier & Neustadt, L.L.P.

(57) ABSTRACT

There is provided an image processing method capable of improving the picture quality. The image processing method comprises: incorporating input frame pictures to be displayed on a display device, on the basis of an input picture signal and an input synchronizing signal which is synchronized with the input picture signal; recording the incorporated input frame pictures in an input frame memory; and producing output frame pictures from input frame pictures, which have been recorded in the input frame memory, by producing an interpolated picture or inserting a black raster picture or thinning out the frame pictures, between input frame pictures corresponding to a picture information of the input frame picture to be displayed, on the basis of the picture information and the input synchronizing signal and an output synchronizing signal.

1 Claim, 21 Drawing Sheets

U.S. PATENT DOCUMENTS

| | | |
|---|---|---|
| 6,836,293 B2 | 12/2004 | Itoh et al. |
| 7,256,836 B2 * | 8/2007 | Itoh et al. .................. 348/452 |

FOREIGN PATENT DOCUMENTS

| | | |
|---|---|---|
| JP | 5-183877 | 7/1993 |
| JP | 5-236429 | 9/1993 |
| JP | 8-248392 | 9/1996 |
| JP | 9-18740 | 1/1997 |
| JP | 9-325715 | 12/1997 |
| JP | 11-55631 | 2/1999 |
| JP | 11-109921 | 4/1999 |
| JP | 11-220733 | 8/1999 |
| JP | 11-297260 | 10/1999 |
| JP | 2000-10535 | 1/2000 |
| JP | 2000-47630 | 2/2000 |
| JP | 2000-165821 | 6/2000 |
| KR | 1999-0068201 | 8/1999 |

* cited by examiner

IMAGE PROCESSING SYSTEM AND METHOD, AND IMAGE DISPLAY SYSTEM

CROSS REFERENCE TO RELATED APPLICATION

This is a Divisional Application of application Ser. No. 10/970,413, filed Oct. 22, 2004, which is a Divisional Application of application Ser. No. 09/885,138, filed Jun. 21, 2001, which are based upon and claim benefit of priority from the prior Japanese Patent Application No. 2000-189479, filed on Jun. 23, 2000; the contents of each of which are incorporated herein by reference.

BACKGROUND OF THE INVENTION

1. Field of the Invention

The present invention relates generally to an image processing system and method, and an image display system.

2. Description of Related Art

As conventional image display devices, there are two-types of impulse type display devices (e.g., CRTs, field emission type display devices (which will be hereinafter referred to as FEDs)), which continue to emit light only for the afterglow time of a fluorescent substance after writing an image, and hold type display devices (e.g., liquid crystal displays (which will be hereinafter referred to as LCDs), electroluminescent displays (which will be hereinafter referred to as ELDs)), which continue to hold the display of the last frame until a new image is written. There are also plasma display panels (which will be hereinafter referred to as PDPs) and projectors using a film. The PDP is a system for carrying out a gradation display in time axis directions, which is called a pulse width modulation method, so that the PDP is considered as a kind of hold type. The projector using a film is considered as a hybrid type for carrying out irradiation and non-irradiation of an image for a frame period. As other systems of a hybrid type, a system using a LCD and a shutter has been proposed by Japan Association of Broadcasters (see Japanese Patent Laid-Open Publication No. 1997-325715), and a system using a LCD and a flashing back light has been proposed by International Business Machines Corporation (see Japanese Patent Laid-Open Publication No. 1999-109921).

The hold type display device has a problem in that the blurred phenomenon and the discontinuous display phenomenon are caused during the display of a moving picture. As shown in FIG. 16, the blurred phenomenon is caused by the fact that if observer's eyes track the movement of a moving object, the eyes observe the picture while moving on the last frame picture, although the same picture of the last frame continues to be displayed in a frame before the picture of the next frame is displayed. That is, the tracking motion of eyes has continuity, so that fine sampling is carried out. As a result, blurring is observed by carrying out visual recognition so that a picture between the first frame and the second frame is buried. On the other hand, the discontinuous display phenomenon is particularly observed in the case of a fixation viewpoint, and is based on the fact that pictures of several frames are substantially simultaneously observed as shown in FIG. 17. These phenomena depend on the speed of the moving object. If the speed of the moving object increases, the correlation between the last frame picture and the next frame picture deteriorates, so that the phenomena are more conspicuously observed.

On the other hand, the impulse type display device has a problem in that the picture jumping phenomenon is caused during the display of a moving picture. Although this picture jumping phenomenon is observed similar to the above described discontinuous display phenomenon, it is described by a different expression since the cause of occurrence is different from that of the discontinuous display phenomenon. The picture jumping phenomenon is also particularly caused at a fixation viewpoint. In the impulse type display device, since display disappears between frames, in other words, a picture having no correlation right before a next frame is not displayed, so that blurring decreases. On the contrary, the picture jumping phenomenon is more conspicuously visually recognized even in usual observation circumstances. The picture jumping phenomenon depends on the speed of a moving object and a frame frequency (the reciprocal of a frame period). It is considered that the reason why the picture jumping phenomenon is caused is as follows. If the speed of the moving object increases with respect to the frame frequency, although a correct image is projected on retinas in time series, the image between the last frame and the next frame disappears as shown in FIG. 18, so that the interpolation processing is not sufficiently carried out in brains.

Thus, in conventional image display devices, there is a problem in that the picture quality deteriorates in accordance with the displayed contents. It seems that the deterioration of the picture quality is more conspicuous with the increase of images having clear contours, i.e., images including high spatial frequency spectra, such as images obtained by computer graphics or the like and images picked up by a high-speed shutter video camera.

SUMMARY OF THE INVENTION

According to one aspect of the present invention, an image processing method comprises: incorporating input frame pictures to be displayed on a display device, on the basis of an input picture signal and an input synchronizing signal which is synchronized with the input picture signal; recording the incorporated frame pictures in an input frame memory; and producing output frame pictures from input frame pictures, which have been recorded in the input frame memory, by producing an interpolated picture or inserting a black raster picture or thinning out the input frame pictures, between input frame pictures corresponding to a picture information of the input frame picture to be displayed, on the basis of the picture information and the input synchronizing signal and an output synchronizing signal.

The production of the output frame pictures may comprise: comparing the refresh rate of the input frame pictures with the refresh rate of the output frame pictures; outputting the input frame pictures as the output frame picture, or outputting the input frame pictures, between which the black raster picture is inserted, as the output frame pictures, when the refresh rate of the input frame pictures is equal to the refresh rate of the output frame pictures; producing an interpolated picture between the input frame pictures, or outputting the input frame pictures, between which the black raster picture is inserted, as the output frame pictures, when the refresh rate of the output frame pictures is higher than the refresh rate of the input frame pictures; and thinning out the input frame pictures, or producing an interpolated picture between the input frame pictures, or outputting the input frame pictures, between which the black raster picture is inserted, as the output frame pictures, when the refresh rate of the output frame pictures is lower than the refresh rate of the input frame pictures.

The picture information may include information which indicates whether the picture to be displayed is a moving picture or a still picture, and the method may further comprise discriminating whether the picture to be displayed is a moving picture or a still picture.

The discriminating may comprise: incorporating frame pictures of the picture to be displayed, at regular intervals on the basis of the input picture signal and the input synchronizing signal; and obtaining the correlation between two input frame pictures which have been continuously incorporated, the method discriminating whether the picture to be displayed is a moving picture or a still picture on the basis of the correlation result.

The discriminating may comprise determining whether the moving picture is in a first state in which the motion of a moving object in the moving picture is rapid, or in a second state in which the moving speed of the moving object is slower than that in the first state, on the basis of the correlation, when it is determined that the picture to be displayed is a moving picture.

The correlation may be obtained on the basis of the difference between pixels corresponding to the continuously incorporated two input frame pictures.

The correlation may be obtained on the basis of the scalar quantity of a motion vector.

When it is discriminated that the picture to be displayed is a moving picture and when it is determined that the moving speed of the moving object in the moving picture is in the first state, the production of the output frame pictures may comprise: comparing the refresh rate of the input frame pictures with the refresh rate of the output frame pictures; outputting the input frame pictures as the output frame picture, when the refresh rate of the input frame pictures is equal to the refresh rate of the output frame pictures; producing an interpolated picture between the input frame pictures to output the interpolated picture, when the refresh rate of the output frame pictures is higher than the refresh rate of the input frame pictures; and thinning out the input frame pictures to produce and output the output frame pictures, when the refresh rate of the output frame pictures is lower than the refresh rate of the input frame pictures.

The display device may be an impulse type display device, and when it is discriminated that the picture to be displayed is a moving picture and when it is determined that the moving speed of the moving object in the moving picture is in the second state, the production of the output frame pictures may comprise: comparing the refresh rate of the input frame pictures with the refresh rate of the output frame pictures; outputting the input frame pictures as the output frame picture, when the refresh rate of the input frame pictures is equal to the refresh rate of the output frame pictures; stopping the output of signals between the input frame pictures, or inserting and outputting a black raster picture, when the refresh rate of the output frame pictures is higher than the refresh rate of the input frame pictures; and thinning out the input frame pictures to produce and output the output frame pictures, when the refresh rate of the output frame pictures is lower than the refresh rate of the input frame pictures.

The display device may be a hold type display device, and when it is discriminated that the picture to be displayed is a moving picture and when it is determined that the moving speed of the moving object in the moving picture is in the second state, the production of the output frame pictures may comprise: comparing the refresh rate of the input frame pictures with the refresh rate of the output frame pictures; outputting the input frame pictures as the output frame picture, when the refresh rate of the input frame pictures is equal to the refresh rate of the output frame pictures; stopping the outputs of the output picture signal and the output synchronizing signal between the input frame pictures, when the refresh rate of the output frame pictures is higher than the refresh rate of the input frame pictures; and thinning out the input frame pictures to produce and output the output frame pictures, when the refresh rate of the output frame pictures is lower than the refresh rate of the input frame pictures.

When it is discriminated that the picture to be displayed is a still picture, the production of the output frame pictures may comprise: comparing the refresh rate of the input frame pictures with the refresh rate of the output frame pictures; outputting the input frame pictures as the output frame picture, when the refresh rate of the input frame pictures is equal to the refresh rate of the output frame pictures; displaying the same picture between the output frame pictures, or stopping the output of signals between the input frame pictures, when the refresh rate of the output frame pictures is higher than the refresh rate of the input frame pictures; and thinning out the input frame pictures to produce and output the output frame pictures, when the refresh rate of the output frame pictures is lower than the refresh rate of the input frame pictures.

The interpolated picture or the black raster picture may be selected in accordance with the magnitudes of a spatial frequency and frequency spectra in one frame picture.

Alternatively, the interpolated picture or the black raster picture may be selected in accordance with the speed of a moving object in the picture to be displayed.

According to another aspect of the present invention, an image processing system comprises a picture signal converting part converting an input picture signal, which is a picture signal for a picture to be displayed on a display device for displaying a picture while changing the picture every frame picture, and an input synchronizing signal, which is synchronized with the input picture signal, into an output picture signal, which is a picture signal for a picture suitable for the display device, and an output synchronizing signal which is synchronized with the output picture signal, on the basis of picture information of the picture to be displayed on the display device, the picture signal converting part comprising: an input frame memory in which a frame picture is recorded; an input switching part transmitting a input frame picture to be displayed, to the input frame memory on the basis of the input picture signal and the input synchronizing signal; a black raster picture producing part in which a black raster picture has been produced or stored; a picture converting part producing output frame pictures from input frame pictures, which have been recorded in the input frame memory, by producing an interpolated picture or inserting a black raster picture or thinning out the input frame pictures, between input frame pictures corresponding to the picture information, on the basis of the picture information and the input synchronizing signal and the output synchronizing signal; an output frame memory recording therein the output frame pictures; and an output control switching part taking the output picture signal and the output synchronizing signal out of the output frame pictures, which have been recorded in the output frame memory, to transmit the signals to the display device.

The picture signal converting part may include priority processing means for spatial-frequency-dividing one frame picture and using an interpolated picture, not a black raster picture, as an output frame picture, with respect to a picture containing high frequency spectra.

BRIEF DESCRIPTION OF THE DRAWINGS

The present invention will be understood more fully from the detailed description given herebelow and from the accompanying drawings of the embodiments of the invention. However, the drawings are not intended to imply limitation of the invention to a specific embodiment, but are for explanation and understanding only.

In the drawings.

DESCRIPTION OF THE EMBODIMENTS

Referring now to the accompanying drawings, the embodiments of the present invention will be described below.

First Embodiment

Figure 1:
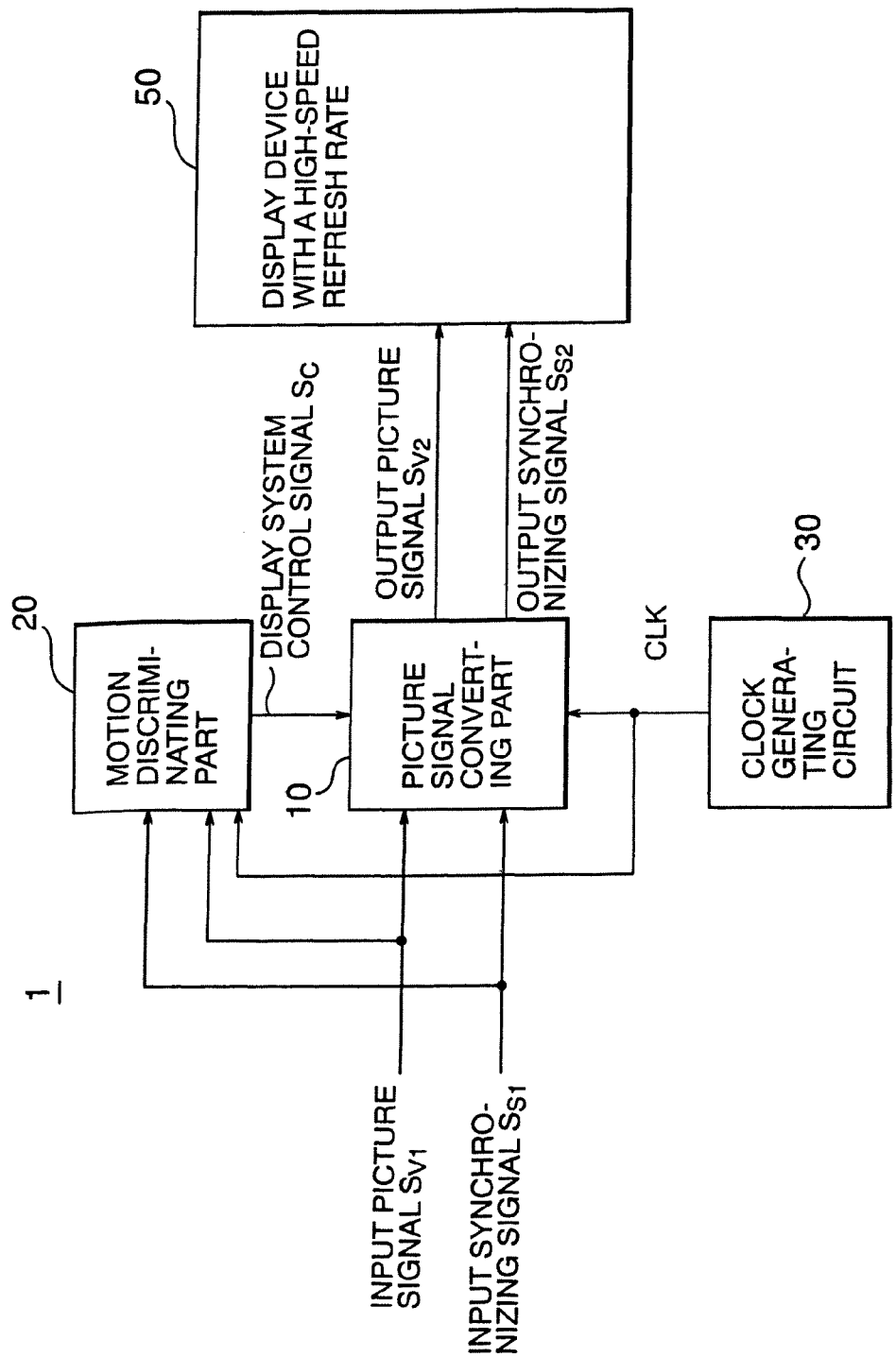
FIG. 1 is a block diagram showing the construction of the first embodiment of an image display system according to the present invention.

Referring to FIGS. 1 through 7, the first embodiment of the present invention will be described below. FIG. 1 shows the construction of the first embodiment of an image display system according to the present invention. In this embodiment, the image display system comprises an image processing device 1 and a display device with a high-speed refresh rate 50. The image processing device 1 comprises a picture signal converting part 10, a motion discriminating part 20 and a clock generating circuit 30.

The picture signal converting part 10 is designed to convert an input picture signal $S_{v1}$ and an input synchronizing signal $S_{s1}$, which are fed from the side of an image source (e.g., a personal computer, a digital versatile disk (DVD), an NTSC signal source or an HDTV signal source) on the basis of a display system control signal from the motion discriminating part 20 and a clock signal from the clock generating circuit 30, into an output picture signal $S_{v2}$ and an output synchronizing signal $S_{s2}$, respectively, to transmit the converted signals to the display device 50. Furthermore, the input picture signal $S_{v1}$ and the input synchronizing signal $S_{s1}$, and the output picture signal $S_{v2}$ and the output synchronizing signal $S_{s2}$ are not always the same as will be described later. The input picture signal $S_{v1}$ and the input synchronizing signal $S_{s1}$, have a signal type determined by the image source side, and the output picture signal $S_{v2}$ and the output synchronizing signal $S_{s2}$ have a signal type determined by the display device 50. For the converting processing, these signals are latched by a clock signal CLK which is outputted from the clock generating circuit 30. Furthermore, the clock signal CLK for latching the above described picture signal and so forth may be inputted to the picture signal converting part 10 from the outside. In this case, it is not required to provide the clock generating circuit 30.

The display device 50 is a display device for changing and displaying a picture every frame. If this display device has a multi-scan converter, the horizontal and vertical frequencies of the output picture signal $S_{v2}$ and the output synchronizing signal $S_{s2}$ outputted from the picture signal converting part 10 are set so as to be frequencies which are not higher than the maximum horizontal frequency and maximum vertical frequency, respectively, which can be displayed by the display device 50. Therefore, there is provided a multi-frame converter capable of coping with an optional input frame frequency (the vertical frequency of the input synchronizing signal $S_{s1}$) and an optional output frame frequency (the vertical frequency of output picture signal $S_{v2}$) which is not higher than the maximum vertical frequency which can be displayed.

The motion discriminating part 20 will be described below. The motion discriminating part 20 is designed to incorporate frame pictures at regular intervals on the basis of the input picture signal $S_{v1}$ and the input synchronizing signal $S_{s1}$ which are fed from the image source, to examine the correlation between continuously incorporated two frame pictures to determine whether the two frame pictures are moving pictures or still pictures. The determined results are transmitted to the picture signal converting part 10 as picture information included in the display system control signal.

Figure 2:
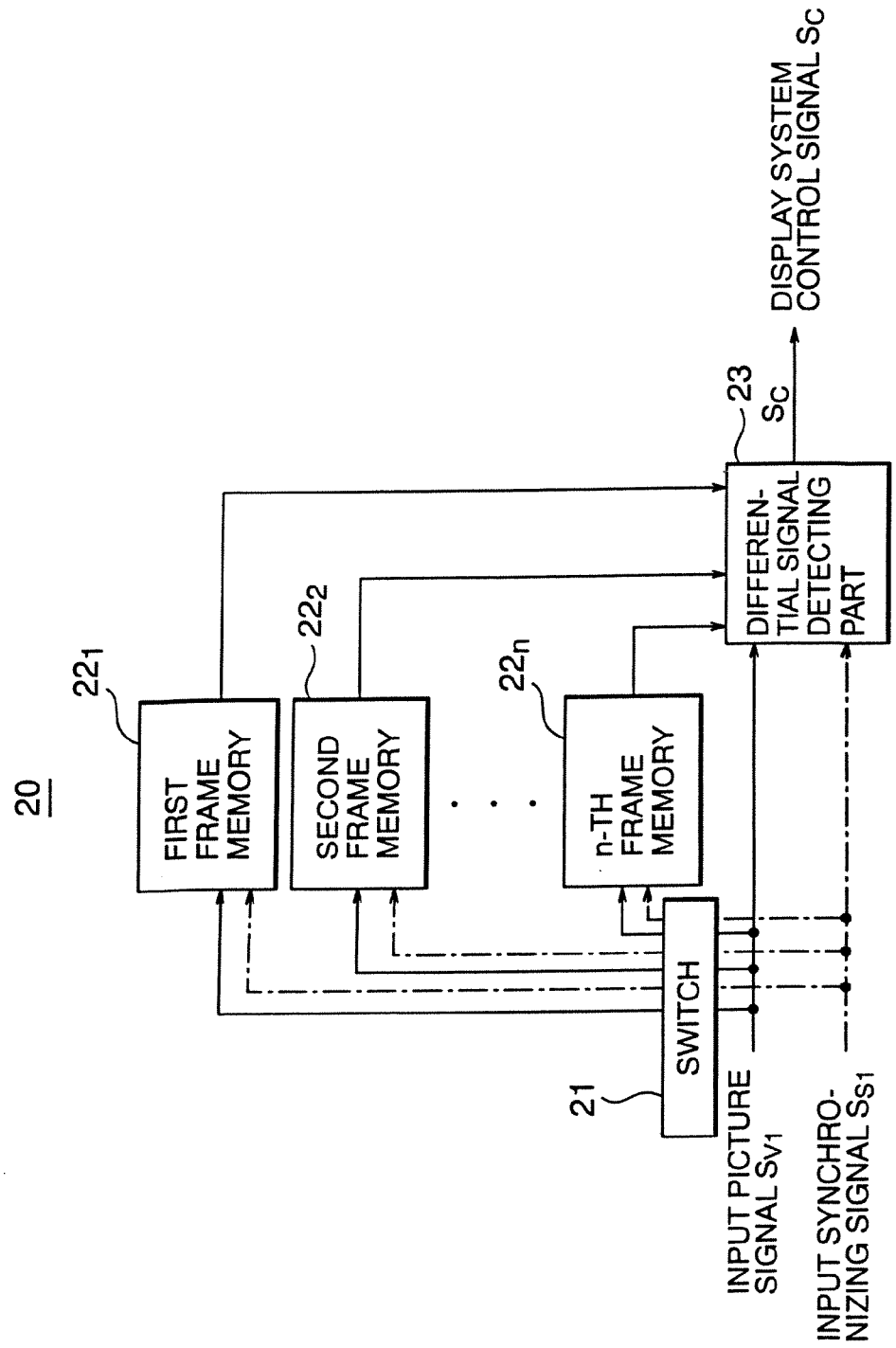
FIG. 2 is a block diagram showing the construction of an embodiment of a motion discriminating part in an image display system according to the present invention.

FIG. 2 shows the construction of an embodiment of the motion discriminating part 20. In this embodiment, the motion discriminating part 20 comprises a switch 21, first through n-th n(n≧2) frame memories $22_1, \ldots, 22_n$ for storing frame pictures, and a differential signal detecting part 23. On the basis of the input picture signal $S_{v1}$ and the input synchronizing signal $S_{s1}$ which are fed from the image source, frame pictures are incorporated at regular intervals by means of the switch 21 to be sequentially written in the frame memories $22_1, \ldots, 22_n$ in time series. The regular intervals means, e.g., intervals of 1/60 sec. Therefore, the frame numbers of the frame pictures stored in the frame memories $22_1, \ldots, 22_n$ are different in accordance with the frame frequency of the input picture which is fed from the image source to be inputted to the image signal converting part 10. For example, when the frame frequency of the input picture is 60 Hz, the first frame picture is recorded in the first frame memory $22_1$, the second frame picture is recorded in the second frame memory $22_2$, and the n-th (n≧2) frame picture is recorded in the n-th frame memory $22_n$. Then, the (n+1)-th frame picture is recorded in the first frame memory $22_1$. Therefore, the k-th (k≧1) frame picture is recorded in the r-th frame memory $22_r$ if a reminder r is not zero assuming the reminder is r when k is divided by n. Furthermore, when the reminder r is zero, the k-th frame picture is recorded in the n-th frame memory $22_n$. When the frame frequency of the input picture is 240 Hz, the frame pictures are recorded in the frame memories $22_1, \ldots, 22_n$ at intervals of four frame pictures (at intervals of 1/60 sec). When the frame frequency of the input image is 480 Hz, the frame pictures are recorded in the frame memories $22_1, \ldots, 22_n$ at intervals of eight frame pictures (at intervals of 1/60 sec).

The frame pictures are thus incorporated at regular intervals (at intervals of 1/60 sec in the above description). Then, on the basis of the correlation between these frame pictures, the differential signal detecting part 23 determines whether the frame pictures are moving pictures or still pictures.

The differential signal determining part 23 is designed to examine the correlation between frame pictures by obtaining the difference between two frame pictures, which have been stored in frame memories of two continuous numbers (e.g., i-th (i=1, ..., n-1) frame memory and the (i+1)-th frame memory, or the n-th frame memory and the first frame memory), i.e., the difference between picture signals between corresponding pixels. It is not required to obtain the difference on the basis of all of bits of the picture signals (e.g., 8 bits if the picture signals have 8 bits), but the difference may be detected on the basis of the upper 4 bits. In this case, each of the frame memories $22_1, \ldots, 22_n$ may be formed so as to be capable of recording only the upper 4 bits of the picture signal of each pixel, so that the capacity can be smaller than that when all of bits are recorded.

A method for determining whether frame pictures are moving pictures or still pictures on the basis of the results of the above described operation of the difference will be described below.

If the difference between picture data between corresponding pixels of the above described two frame pictures is zero in all of pixels, it may be determined that the frame pictures are still pictures, and in other cases, it may be determined that the frame pictures are moving pictures. Alternatively, a threshold may be set, and it may be determined that the frame pictures are moving pictures if there is a pixel wherein the absolute value of the difference is not lower than the threshold. Alternatively, the absolute values of the differences may be summed with respect to all of pixels or with respect to pixels sampled at regular intervals (e.g., at intervals of three pixels), and it may be determined that the frame pictures are moving pictures when the sum is not less than the threshold. Furthermore, the determined results are transmitted to the picture signal converting part 10 as information included in the display system control signal.

Figure 3:
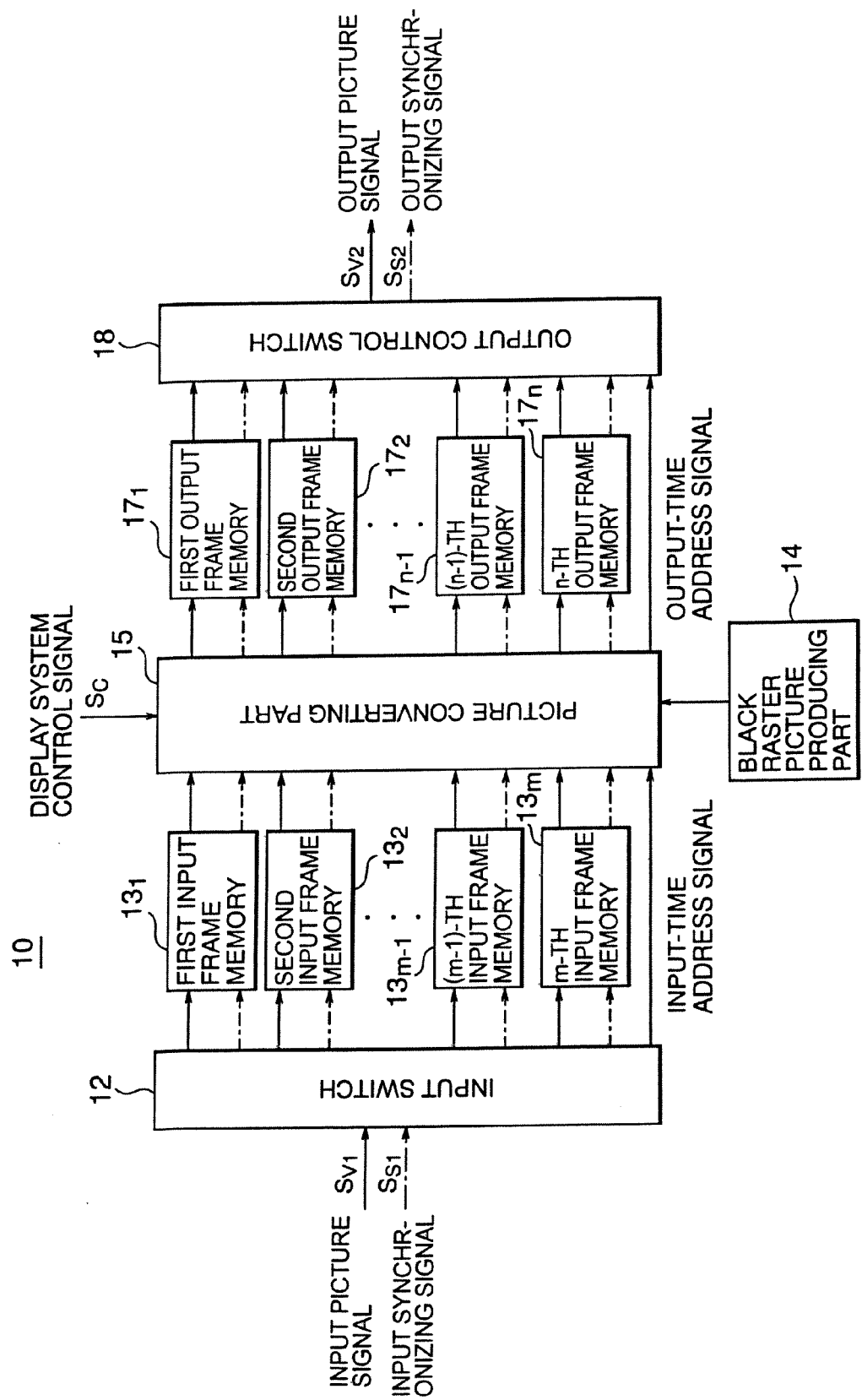
FIG. 3 is a block diagram showing the construction of an embodiment of a picture signal converting part in an image display system according to the present invention.

Referring to FIG. 3, the construction of an embodiment of the picture signal converting part 10 will be described below. In this embodiment, the picture signal converting part 10 comprises an input switch 12, first through m-th m input frame memories $13_1, \ldots, 13_m$, a black raster picture producing part 14, a picture converting part 15, first through n-th n output frame memories $17_1, \ldots, 17_n$, and an output control switch 18.

On the basis of the input picture signal $S_{v1}$ and the input synchronizing signal $S_{s1}$ which are fed from the image source, frame pictures are incorporated by the input switch 12 to sequentially recorded in the first through m-th m input frame memories $13_1, \ldots, 13_m$. Furthermore, an input-time address signal indicative of the fact that which input frame memory has stored therein the input frame picture is fed from the input switch 12 to the picture converting part 15. On the basis of the synchronizing signals $S_1$, $S_2$, the display system control signal $S_c$ from the motion discriminating part 20, and the input-time address signal from the input switch 12, the picture converting part 15 directly outputs the recorded frame pictures as output frame pictures, or produces interpolated pictures between two frame pictures, which have been recorded in the frame memories of two continuous numbers, to output the interpolated pictures as output frame pictures, or outputs black raster pictures, which have been produced by the black raster producing part 14, as output frame pictures. The output frame pictures are sequentially recorded in the first through n-th output frame memories $17_1, \ldots, 17_n$. Furthermore, an output-time address signal indicative of the fact that which output frame memory has stored therein the output frame picture is fed from the image converting part 15 to the output control switch 18. Then, the recorded output frame pictures are fed to the display device with a high-speed refresh rate 50 via the output control switch 18 as the output picture signal $S_{v2}$ and output synchronizing signal $S_{s2}$.

If the processing time required to prepare an interpolated picture in the image converting part 15 is the same as the frame picture incorporating time interval (e.g., 1/60 sec) in the motion discriminating part 20, the number m of the input frame memories of the picture signal converting part 10 shown in FIG. 3 must be 3 (=60/60+2) when the synchronizing signal $S_{s1}$ has 60 Hz, 6(=240/60+2) when the synchronizing signal $S_{s1}$ has 240 Hz, and 10 (=480/60+2) when the synchronizing signal $S_{s1}$ has 480 Hz. The reason why "+2" is added is that the total two frame memories including a frame memory for preparing an interpolated picture and a frame memory for inputting a new picture while preparing the interpolated pictures are required.

When the processing time required to prepare an interpolated picture is higher than the frame picture incorporating time in the motion discriminating part 20, the number m of the input frame memories $13_1, \ldots, 13_m$ must be three of two frame memories for inputting two frame pictures and a frame memory for preparing an interpolated picture.

The operation of the picture signal converting part 10 will be described below. The conversion of a picture signal is basically determined by comparing the vertical frequency of an input synchronizing signal $S_{s1}$ (the refresh rate of an input frame picture) and the vertical frequency of an output synchronizing signal $S_{s2}$ (the refresh rate of an output frame picture).

When the refresh rate of the input frame picture is equal to the refresh rate of the output frame picture, it is not required to produce an interpolated picture as the output frame picture, and input frame pictures having been sequentially recorded in the first through m-th input frame memories $13_1, \ldots, 13_m$ are sequentially fed directly to the first through n-th output frame memories $17_1, \ldots, 17_n$ as output frame pictures to be recorded therein. Alternatively, input frame pictures, which have been sequentially recorded in the first through m-th input frame memories $13_1, \ldots, 13_m$ and between which black raster pictures have been inserted, are sequentially fed to the first through n-th output frame memories $17_1, \ldots, 17_n$ as output frame pictures to be recorded therein. Then, the output frame pictures, which have been recorded in the first through n-th output frame memories $17_1, \ldots, 17_n$, are taken out via the output control switch 18 as output picture signals $S_{v2}$ and output synchronizing signals $S_{s2}$ to be transmitted to the display device 50.

On the other hand, when the refresh rate of the output frame picture is higher than the refresh rate of the input frame picture, it is required to increase the number of frames. Therefore, interpolated pictures are produced, or black raster pictures are inserted. Referring to FIGS. 4 through 7, the production of the interpolated pictures will be described below.

Figure 4:
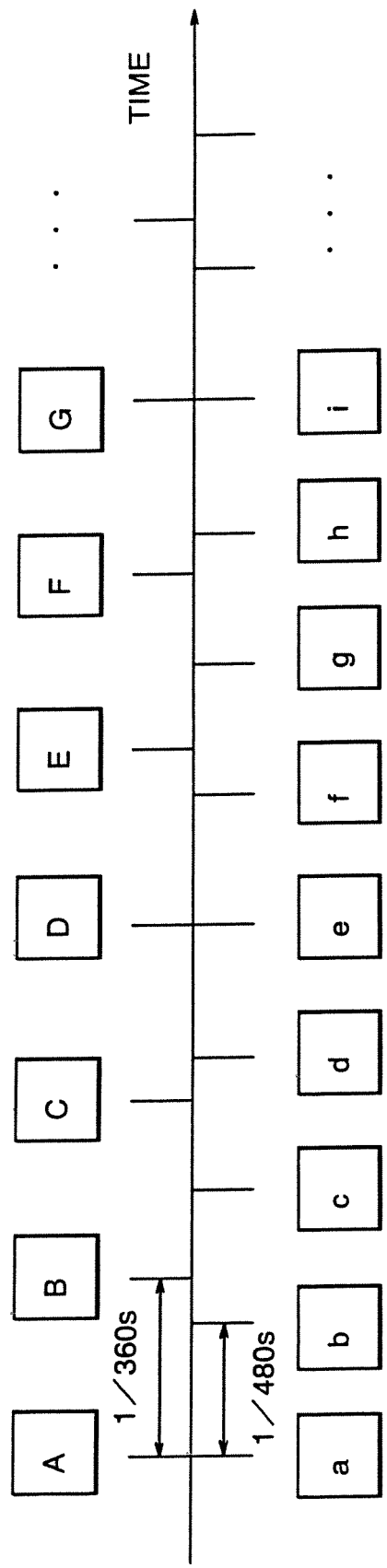
FIG. 4 is an illustration for explaining the production of interpolated pictures which are produced by a picture signal converting part.
Figure 5:
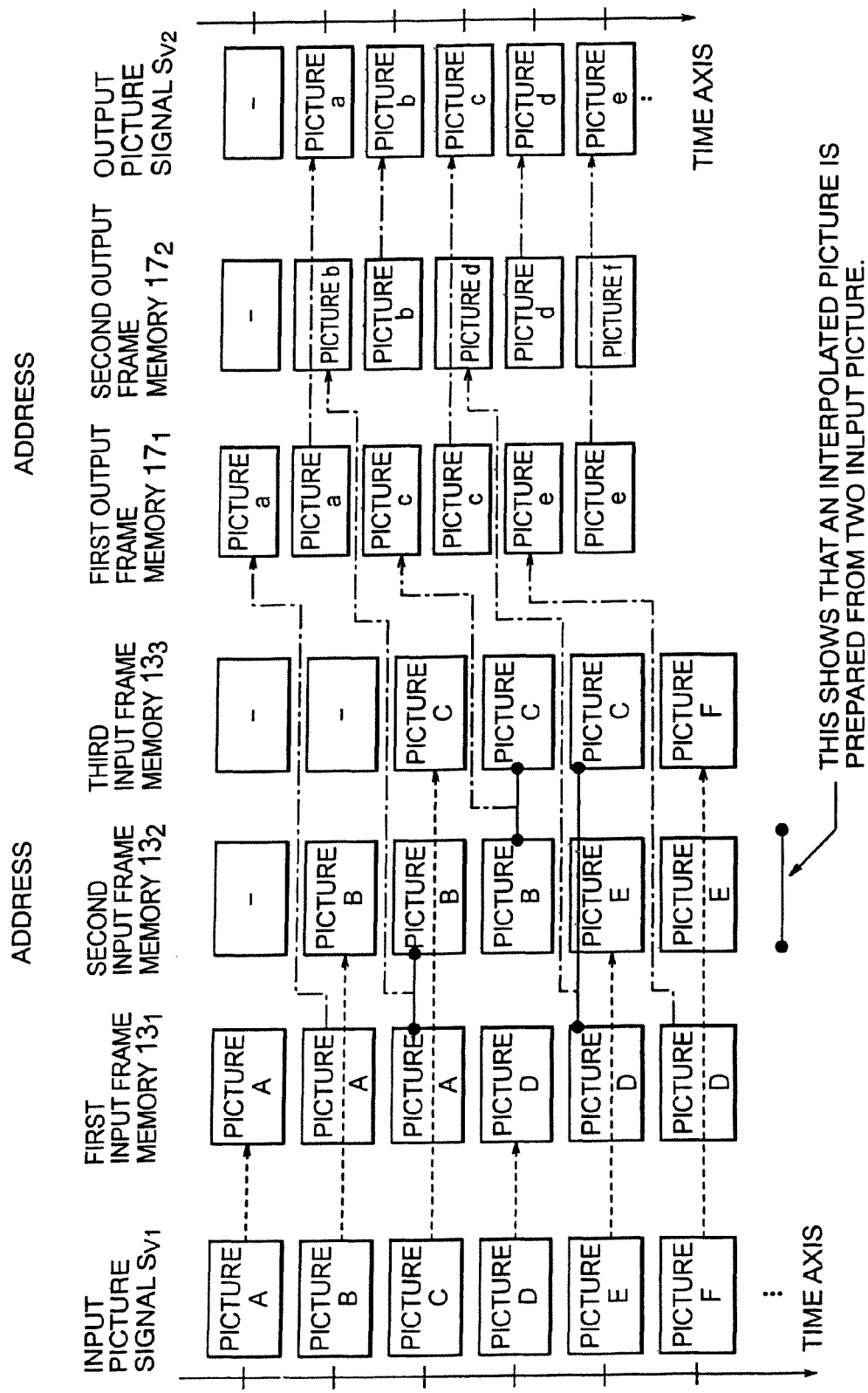
FIG. 5 is an illustration for explaining the production of interpolated pictures which are produced by a picture signal converting part.

FIG. 4 is an illustration for explaining the production of interpolated pictures when the refresh rate of an input frame picture is 360 Hz and the refresh rate of an output frame picture is 480 Hz, and FIG. 5 is an illustration for explaining a method for inputting the input frame picture to the input frame memory and a method for inputting the output frame picture to the output frame memory at this time.

First, as shown in FIG. 5, after input frame pictures A, B and C are inputted to the first, second and third input frame memories $13_1$, $13_2$ and $13_3$, respectively, to be recorded therein, input frame pictures D, E and F are repeatedly recorded in the first, second and third input frame memories $13_1$, $13_2$ and $13_3$, respectively. The input control of each of the input frame pictures is carried out by the input switch 12.

An input-time address signal indicative of the relationship between an input frame picture and an input frame memory is fed from the input switch 12 to the picture converting part 15. Then, the picture converting part 15 produces an input picture from the input frame picture while adjusting the time axis. For example, the input frame picture A is fed to the first output frame memory $17_1$ as an output frame picture a without being picture-converted by the picture converting part 15, to be recorded therein (see FIGS. 4 and 5). The intervals of one frame between the input frame picture and the output frame picture are different by $1/1440$ sec $(=1/360 - 1/480)$. Therefore, the picture converting part 15 produces an interpolated picture, which is shifted in the direction of the time axis (shifted in advance of the input frame picture B by $1/1440$ sec), from the input frame pictures A and B on the basis of the input-time address signal, and the interpolated picture thus produced is outputted as an output frame picture b (see FIG. 4) to be recorded in the second output frame memory $17_2$ (see FIG. 5). Furthermore, while the interpolated picture b is produced, the input frame picture C is inputted to the third input frame memory $13_3$ to be recorded therein (see FIG. 5). In addition, while the interpolated picture b is recorded in the second output frame memory $17_2$, the output frame picture a is outputted as an output picture signal $S_{v2}$ via the output control switch 18.

After the production of the interpolated picture b is completed and the recording of the input frame picture C in the third frame memory $13_3$ is completed, an interpolated picture c, which is shifted in the direction of the time axis (shifted in advance of the input frame picture C by $1/720$ sec) from the input frame pictures B and C, is produced, and the interpolated picture c thus produced is outputted as an output frame picture c to be recorded in the first output frame memory $17_1$ (see FIG. 5).

Furthermore, while the interpolated picture c is produced, the input frame picture D is inputted to the first input frame memory $13_1$ to be recorded therein (see FIG. 5). In addition, while the interpolated picture c is recorded in the first output frame memory $17_1$, the output frame picture b is outputted as an output picture signal $S_{v2}$ via the output control switch 18.

After the production of the interpolated picture c is completed and the recording of the input frame picture D is completed, an interpolated picture d, which is shifted in the direction of the time axis, is produced from the input frame pictures C and D, and is recorded in the second output frame memory $17_2$ as an output frame picture d (see FIGS. 4 and 5). Furthermore, while the interpolated picture d is produced, the input frame picture E is recorded in the second frame memory $13_2$ (see FIG. 5). In addition, while the interpolated picture d is recorded, the output frame picture c is outputted as an output picture signal $S_{v2}$ via the output control switch 18.

Subsequently, the input frame picture D is directly outputted as an output frame picture e to be recorded in the first output frame memory $17_1$. At this time, an input frame picture F is inputted to the third input frame memory $13_3$ to be recorded therein, and an output frame picture d is outputted as an output picture signal $S_{v2}$ from the second output frame memory $17_2$ via the output control switch 18. Thus, it is possible to obtain output frame pictures from input frame pictures.

Since it is assumed in FIGS. 4 and 5 that the input frame picture A is the same as the output frame picture a, the number of input frame memories and the number of output frame memories can be reduced by 5 frames, respectively. As can be seen from FIG. 4, since one output frame picture is prepared from two input frame pictures, it is possible to reduce three frames for input frame pictures (in order to input a picture to another frame memory while two frame pictures are processed), and two frames for output frame pictures (two frames are required when the writing and reading of output frame pictures in and out of the same frame memory can not simultaneously be carried out). Furthermore, in this case, the producing speed of the interpolated picture must be equal to the frequency of the input picture.

Figure 6:
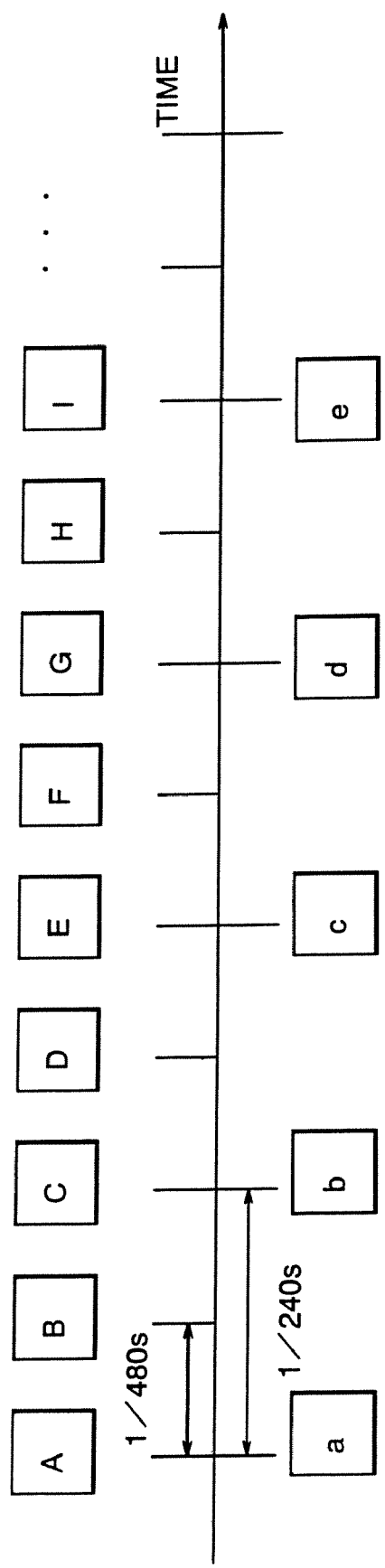
FIG. 6 is an illustration for explaining the production of interpolated pictures which are produced by a picture signal converting part.
Figure 7:
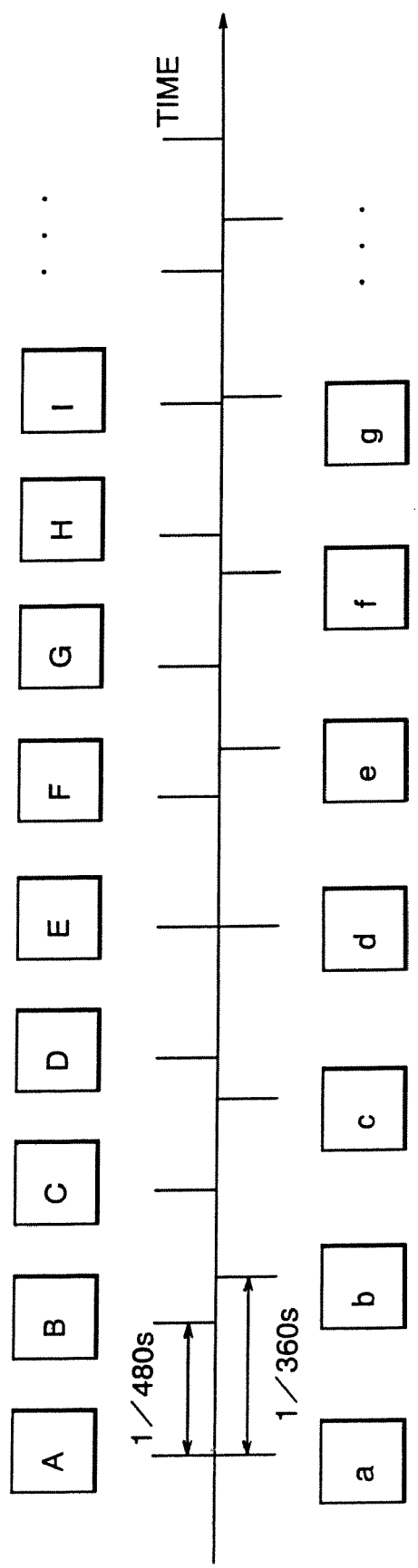
FIG. 7 is an illustration for explaining the production of interpolated pictures which are produced by a picture signal converting part.

On the other hand, when the refresh rate of the output frame picture is higher than the refresh rate of the input frame picture, frame pictures are thinned out, or interpolated pictures are produced, or black raster pictures are inserted. When the refresh rate of the input frame picture is an integer times as large as the refresh rate of the output frame picture (e.g., when the refresh rate of the input frame picture is 480 Hz and the refresh rate of the output frame picture is 240 Hz), frame pictures can be simply thinned out on alternate frame pictures as shown in FIG. 6. In other cases (e.g., when the refresh rate of the input frame picture is 480 Hz and the refresh rate of the output frame picture is 360 Hz), interpolated pictures are produced as shown in FIG. 7. The production of interpolated pictures may be carried out in the same manner as the above described manner. An interpolated picture b, which is shifted in the direction of the time axis (shifted behind the frame picture B by $1/1440$ sec), is produced from the input frame pictures B and C. This is used as an output frame picture b, and an output frame picture c is sequentially prepared from the input frame pictures C and D. Since it is also assumed in FIG. 7 that the input frame picture A is the same as the output frame picture a, the number of input frame memories and the number of output frame memories can be reduced by six frames. In addition, as can be seen from FIG. 7, since one output frame picture is prepared from two input frame pictures, it is possible to reduce three frames for input frame pictures (in order to input a picture to another frame memory while two frame pictures are processed), and two frames for output frame pictures (two frames are required when the writing and reading of output frame pictures in and out of the same frame memory can not simultaneously be carried out).

As another information required to produce a display system control signal, there is a signal indicative of the fact that the display device 50 is an impulse type or a hold type. This signal is received from the connected display device 50. An example of a picture outputted from this display system will be described later. In the black raster picture producing part 14, this signal is used for producing a picture which is displayed during a reset period when the hold type display device is technically used as an impulse type display device. Furthermore, according to the present invention, the black raster picture must not always be black, but it may be blue or magenta which has a low luminosity factor. In order to maintain contrast, the black raster picture is preferably in a display state in which the emission luminance or reflection luminance is low. According to the present invention, the display device with a high-speed refresh rate 50 may be effectively a transmission type display device or a reflection type display device.

On the basis of the display system control signal, the picture signal converting part 10 controls the output picture signal and output synchronizing signal as follows. For example, when it is determined that the display pictures are still pictures, it is assumed that the signal is a signal for indicating the output of an output picture signal and an output synchronizing signal, and when it is determined that the display pictures are moving pictures, it is assumed that the signal is a signal for indicating the output of an interpolated picture and an output synchronizing signal or a signal for indicating the output of a black raster picture or an output synchronizing signal with respect to a hold type display device, and a signal for indicating the stopping of the output of an output picture signal and an output synchronizing signal or the output of an interpolated picture and an output synchronizing signal with respect to an impulse type display device. The display system control signal basically indicates the discriminated results of a moving picture or a still picture. However, as described above, since the indicating method is different in accordance with the kind of the display device (hold type or impulse type), a signal indicative of a hold type or an impulse type can be previously inputted from the display device to the motion discriminating part to set it by a combination of the discriminated result of moving/still picture and the kind of the display device.

Furthermore, in the motion discriminating part 20 in this embodiment, a differential signal of each of frames is taken. When the variation is large, it is determined that the display pictures are rapid moving pictures. When the variation is small, it is determined that the display pictures are slow moving pictures. When there is no variation, it is determined that the display pictures are still pictures. The system for determining the moving speed of the moving picture in the motion discriminating part 20 may be the same as a system which will be described later in the second embodiment. The discriminated result is fed to the output control switch 18 as a display system control signal, and an output picture (an output picture signal and an output synchronizing signal) to the display device 50 is prepared in accordance with a signal indicative of a display system and a moving/still picture indicating signal.

Figure 8:
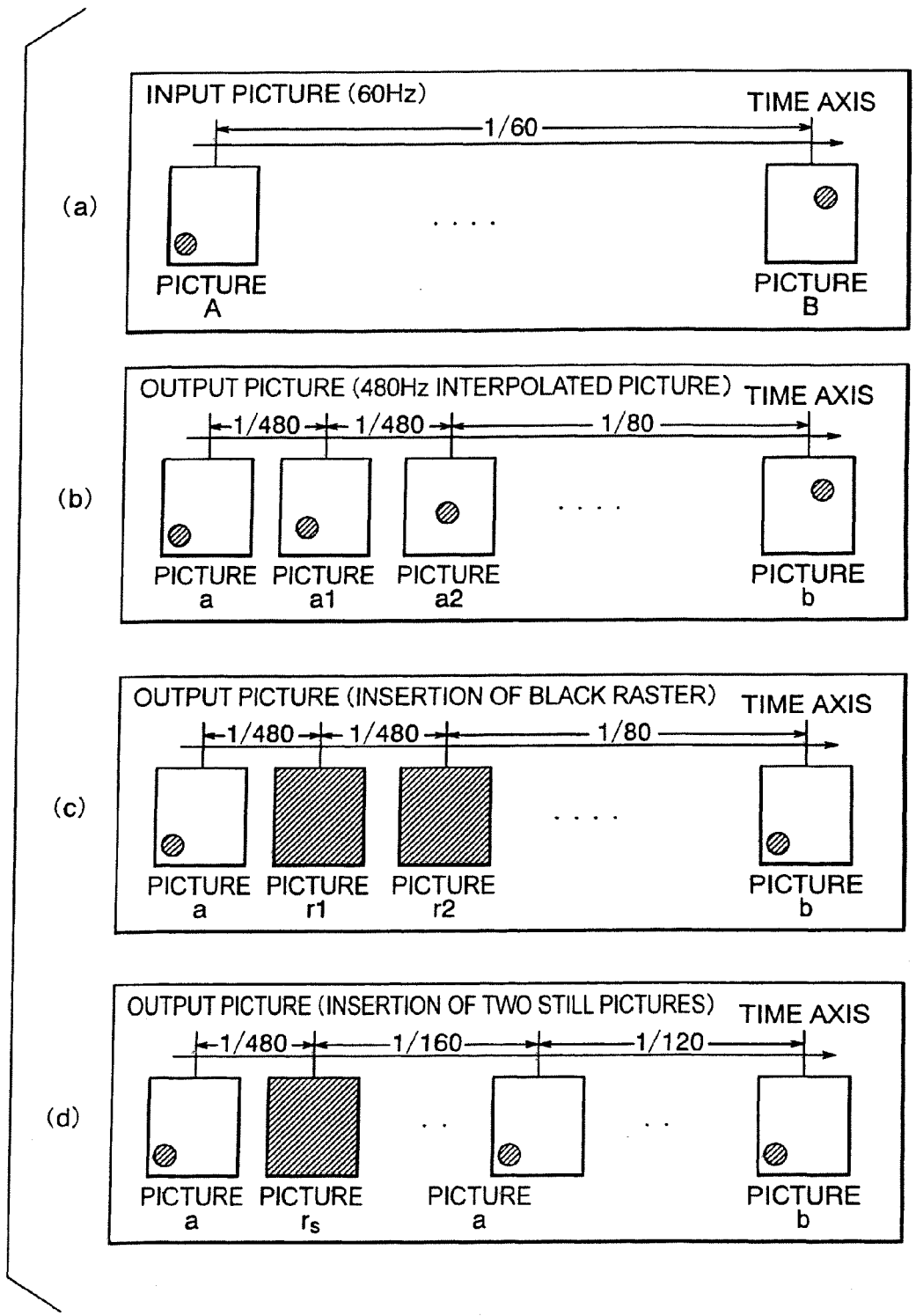
FIG. 8 is an illustration for explaining the production of an output frame picture according to a display system control signal in the first embodiment.

Referring to FIG. 8, the production of an output frame picture according to a display system control signal Sc in the picture signal converting part 10 in the first embodiment will be described below. In the description herein, it is assumed that the refresh rate of an input frame picture is 60 Hz and the refresh rate of an output frame picture is 480 Hz (see FIG. 8).

It is also assumed that the display device is an impulse type display device. In this case, when the motion discriminating part 20 determines that the display pictures are rapid moving pictures, interpolated pictures a1, a2, . . . , a7 which are interpolated between the input frame pictures A and B are produced as shown in FIG. 8(b). That is, the input frame picture A is directly outputted as an output frame picture, the input frame picture B is directly outputted as an output frame picture b, and seven frame pictures therebetween are outputted as the interpolated pictures a1, a2, . . . , a7 as described above. When the motion discriminating part 20 determines that the display pictures are slow moving pictures, after the input frame picture A is outputted as the output frame picture a, until the input frame picture B is outputted as the output frame picture b, black raster pictures r1, . . . , r7 are outputted, or the output of the output picture signal $S_{v2}$ and the output synchronizing signal $S_{s2}$ is stopped, as shown in FIG. 8(c). When the motion discriminating part 20 determines that the display pictures are still pictures, after the input frame picture A is outputted as an output frame picture, black raster pictures $r_s$ are outputted as the second to fourth output frame pictures, and the output frame picture a is outputted as the fifth output frame picture, or the same picture a is outputted over eight frames, as shown in FIG. 8(d).

On the other hand, when the display device is a hold type display device, if it is determined that the display pictures are rapid moving pictures, an interpolated picture which is interpolated between the input frame pictures is outputted as an output frame picture as shown in FIG. 8(b). If it is determined that the display pictures are slow moving pictures, after the output frame picture a is outputted, black raster picture signals are outputted in the second to eighth frames until the output frame picture b is outputted, as shown in FIG. 8(c). If it is determined that the display pictures are still pictures, although the output frame pictures may be outputted as shown in FIG. 8(c) or FIG. 8(d), the outputs of the output picture signal and the output synchronizing signal are stopped instead of the black raster picture signal. Therefore, in this case, the output frame picture a continues to be held.

While the production of output frame pictures according to the display system control signal Sc in the picture signal converting part 10 has been briefly described referring to FIG. 8, this will be described in more detail referring to FIGS. 19 through 22. In this embodiment, the display method can be changed in accordance with the results of comparison of the refresh rate of the input frame picture with the refresh rate of the output frame picture in the picture signal converting part 10 and the results of discrimination in the motion discriminating part 20.

First, a case where the display device with a high-speed refresh rate 50 is an impulse type display device will be described below.

i) Referring to FIG. 19, a case where the motion discriminating part 20 determines that the display pictures are moving pictures will be described below.

Figure 19:
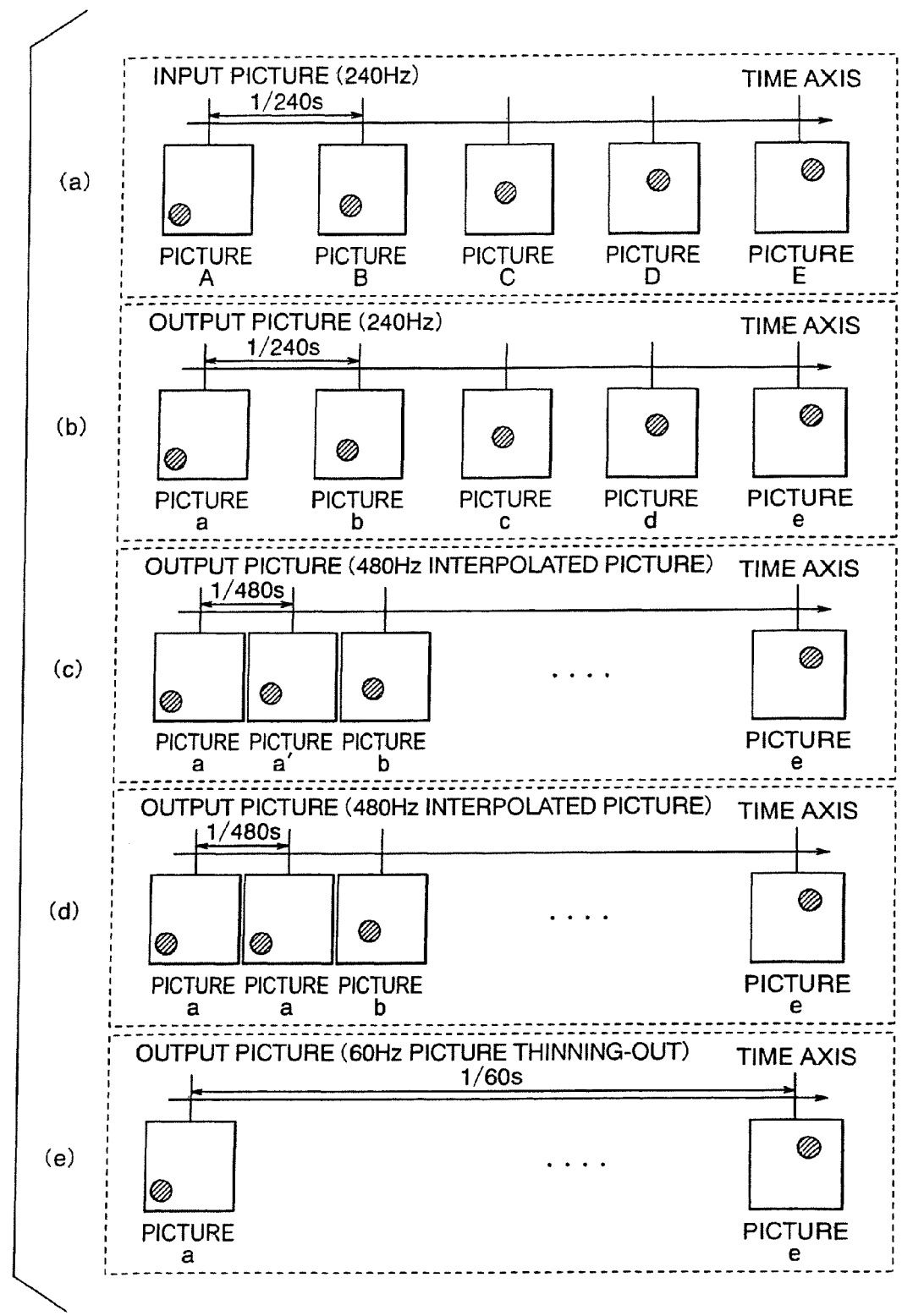
FIG. 19 is an illustration for explaining the production of an output frame picture according to a display system control signal in the first embodiment.

1) When the refresh rate of the input frame picture is equal to the refresh rate of the output frame picture, e.g., when the refresh rate of the input frame picture is 240 Hz and the refresh rate of the output frame picture is 240 Hz, input frame pictures A, B, C, D and E shown in FIG. 19(*a*) are directly outputted as output frame pictures a, b, c, d and e as shown in FIG. 19(*b*).

2) When the refresh rate of the output frame picture is higher than the refresh rate of the input frame picture, e.g., when the refresh rate of the input frame picture is 240 Hz and the refresh rate of the output frame picture is 480 Hz, if the motion discriminating part 20 determines that the display pictures are rapid moving pictures, interpolated pictures are produced and outputted between input frame pictures shown in FIG. 19(*a*) (see FIG. 19(*c*)). That is, interpolated pictures a', . . . are produced and outputted between the output frame pictures, a, b, . . . corresponding to the input frame pictures A, B, . . . . In FIG. 19(*c*), the frame picture a' is an interpolated picture between the output frame pictures a and b.

3) When the refresh rate of the output frame picture is higher than the refresh rate of the input frame picture, e.g., when the refresh rate of the input frame picture is 240 Hz and the refresh rate of the output frame picture is 480 Hz, if the motion discriminating part 20 determines that the display pictures are slow moving pictures, the output of the picture signal between the output frame pictures a, b, c, d and e is stopped, or black raster pictures are inserted between the output frame pictures a, b, c, d and e corresponding to the input frame pictures A, B, C, D and E as shown in FIG. 8(*c*). When the output of the picture signal between the output frame pictures is stopped, nothing is displayed while the picture a' of FIG. 19(*c*) is displayed (not shown). In this case, the luminance of the screen varies by changing the presence of the display during the display of the picture a'. In order to avoid this, the picture a may be directly displayed during the display of the picture a' as shown in FIG. 19(*d*).

4) When the refresh rate of the input frame picture is higher than the refresh rate of the output frame picture, e.g., when the refresh rate of the input frame picture is 240 Hz and the refresh rate of the output frame picture is 60 Hz, the output frame pictures b, c and d corresponding to the input frame pictures B, C and D are thinned out to output picture signals as shown in FIG. 19(*e*).

ii) Referring to FIG. 20, a case where the motion discriminating part 20 determines that the display pictures are still pictures will be described below.

Figure 20:
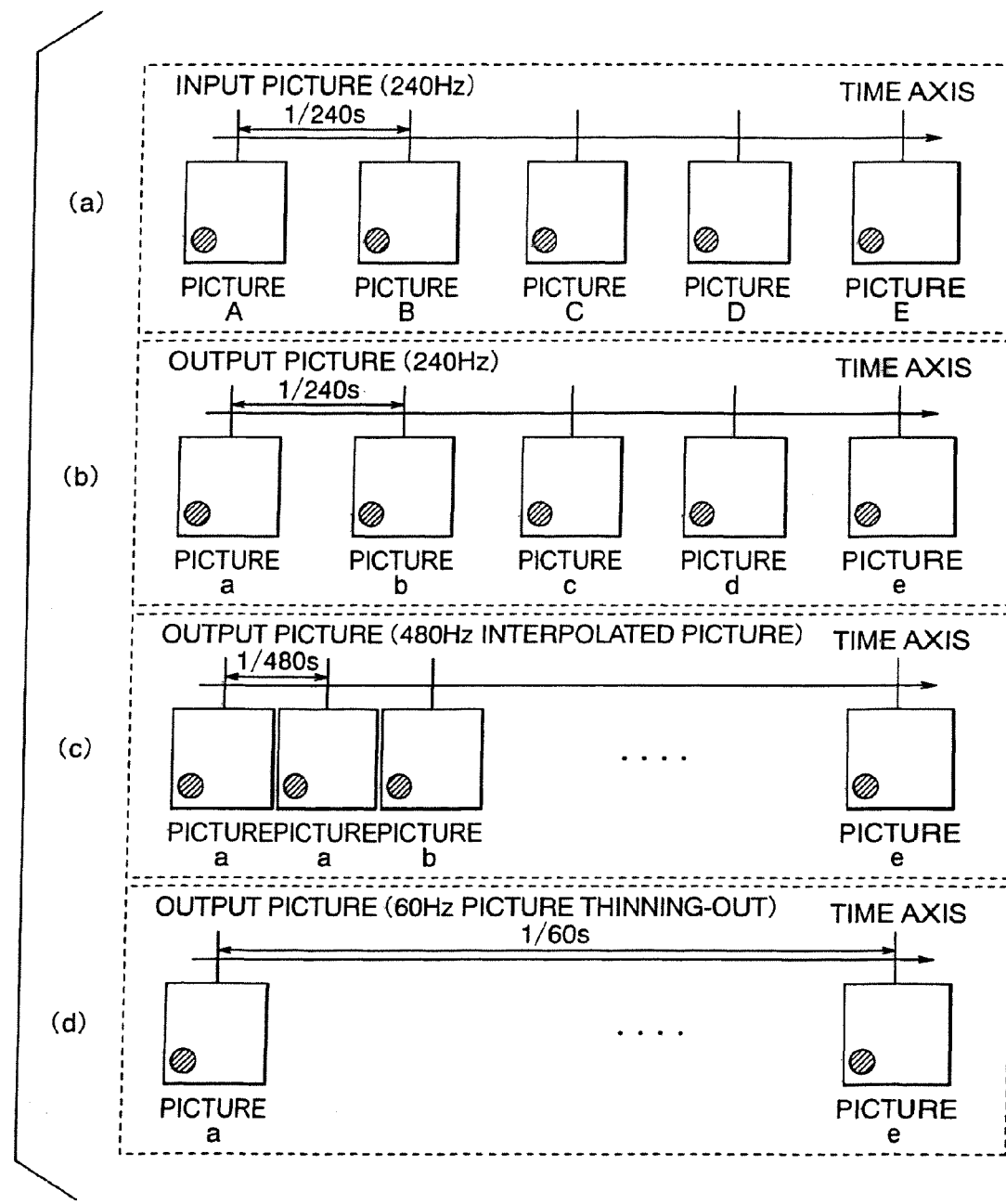
FIG. 20 is an illustration for explaining the production of an output frame picture according to a display system control signal in the first embodiment.

1) When the refresh rate of the input frame picture is equal to the refresh rate of the output frame picture, e.g., when the refresh rate of the input frame picture is 240 Hz and the refresh rate of the output frame picture is 240 Hz, input frame pictures A, B, C, D and E shown in FIG. 20(*a*) are directly outputted as output frame pictures a, b, c, d and e as shown in FIG. 20(*b*).

2) When the refresh rate of the output frame picture is higher than the refresh rate of the input frame picture, e.g., when the refresh rate of the input frame picture is 240 Hz and the refresh rate of the output frame picture is 480 Hz, the same picture is displayed between the output frame pictures as shown in FIG. 20(*c*) (e.g., the picture a is displayed between the output frame pictures a and b). Alternatively, when the frequency of the display device with a high-speed refresh rate is high as this case (e.g., when it is 240 Hz or higher), the output of signals between pictures is stopped, and nothing is displayed while, e.g., the picture a of FIG. 20(*c*), is displayed. In the latter, the frequency of flicker is 120 Hz (half of 240 Hz), there is no problem on flicker.

3) When the refresh rate of the input frame picture is higher than the refresh rate of the output frame picture, e.g., when the refresh rate of the input frame picture is 240 Hz and the refresh rate of the output frame picture is 60 Hz, the output frame pictures b, c and d corresponding to the input frame pictures B, C and D are thinned out to output picture signals as shown in FIG. 20(*d*).

Then, a case where the display device with a high-speed refresh rate 50 is a hold type display device will be described below.

i) Referring to FIG. 21, a case where the motion discriminating part 20 determines that the display pictures are moving pictures will be described below.

Figure 21:
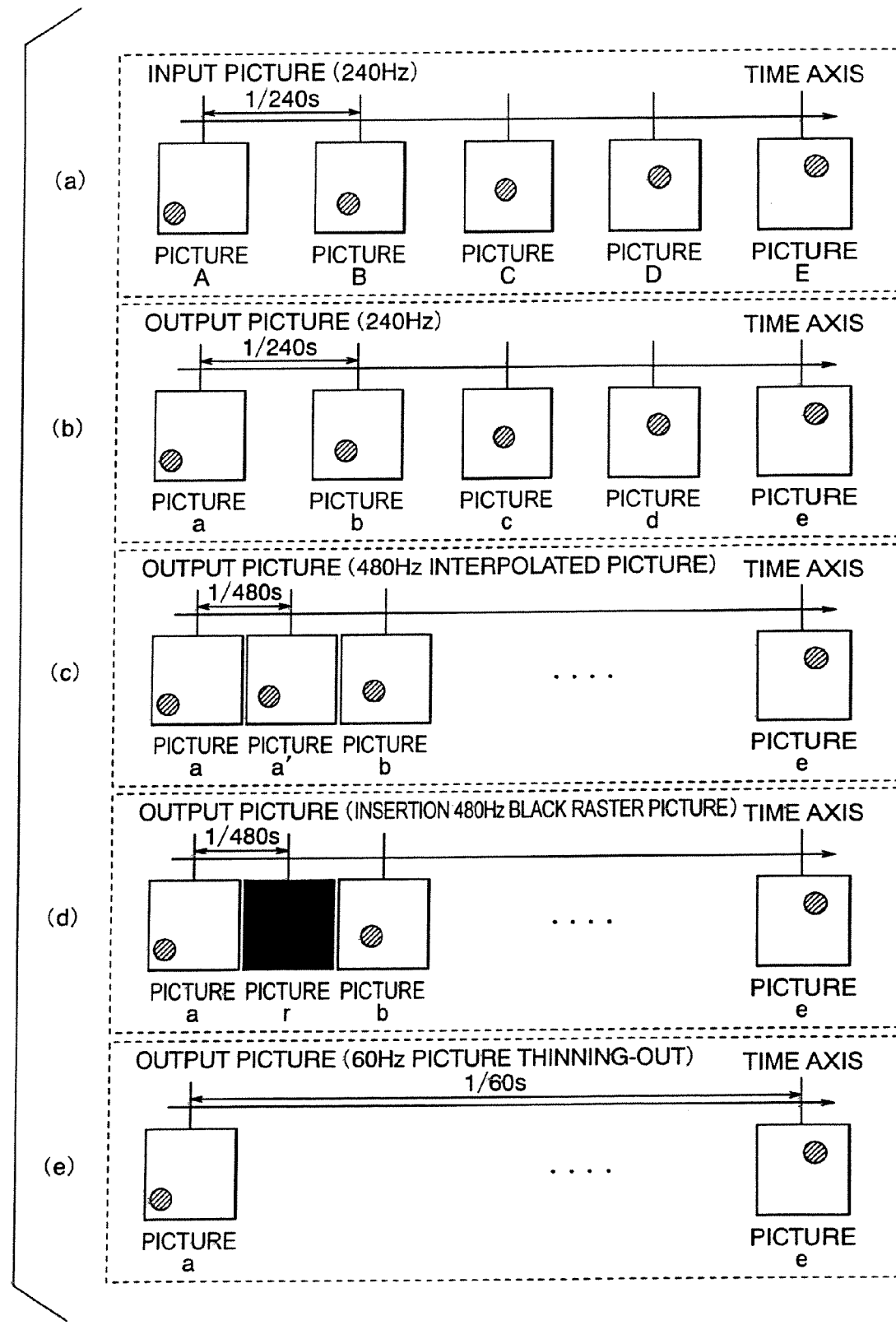
FIG. 21 is an illustration for explaining the production of an output frame picture according to a display system control signal in the first embodiment.

1) When the refresh rate of the input frame picture is equal to the refresh rate of the output frame picture, e.g., when the refresh rate of the input frame picture is 240 Hz and the refresh rate of the output frame picture is 240 Hz, input frame pictures A, B, C, D and E shown in FIG. 21(*a*) are directly outputted as output frame pictures a, b, c, d and e as shown in FIG. 21(*b*).

2) When the refresh rate of the output frame picture is higher than the refresh rate of the input frame picture, e.g., when the refresh rate of the input frame picture is 240 Hz and the refresh rate of the output frame picture is 480 Hz, if the motion discriminating part 20 determines that the display pictures are rapid moving pictures, interpolated pictures a', . . . are produced and outputted between the output frame pictures, a, b, c, d and e corresponding to the input frame pictures A, B, C, D and E as shown in FIG. 21(*c*), or a black raster picture r is inserted as shown in FIG. 21(*d*).

3) When the refresh rate of the output frame picture is higher than the refresh rate of the input frame picture, e.g., when the refresh rate of the input frame picture is 240 Hz and the refresh rate of the output frame picture is 480 Hz, if the motion discriminating part 20 determines that the display pictures are slow moving pictures, the output of the picture signal between pictures is stopped, and an output control signal (not shown) in the hold type display device is deactivated. Thus, for example, in an LCD, gate lines are not in ON state to prevent writing in pixels. Thus, the picture a continues to be displayed while the interpolated picture a' shown in, e.g., FIG. 21(*c*), is displayed (not shown).

4) When the refresh rate of the input frame picture is higher than the refresh rate of the output frame picture, e.g., when the refresh rate of the input frame picture is 240 Hz and the refresh rate of the output frame picture is 60 Hz, the output frame pictures b, c and d corresponding to the input frame pictures A, B, C, D and E are thinned out to output picture signals as shown in FIG. 21(*e*).

ii) Referring to FIG. 22, a case where the motion discriminating part 20 determines that the display pictures are still pictures will be described below.

Figure 22:
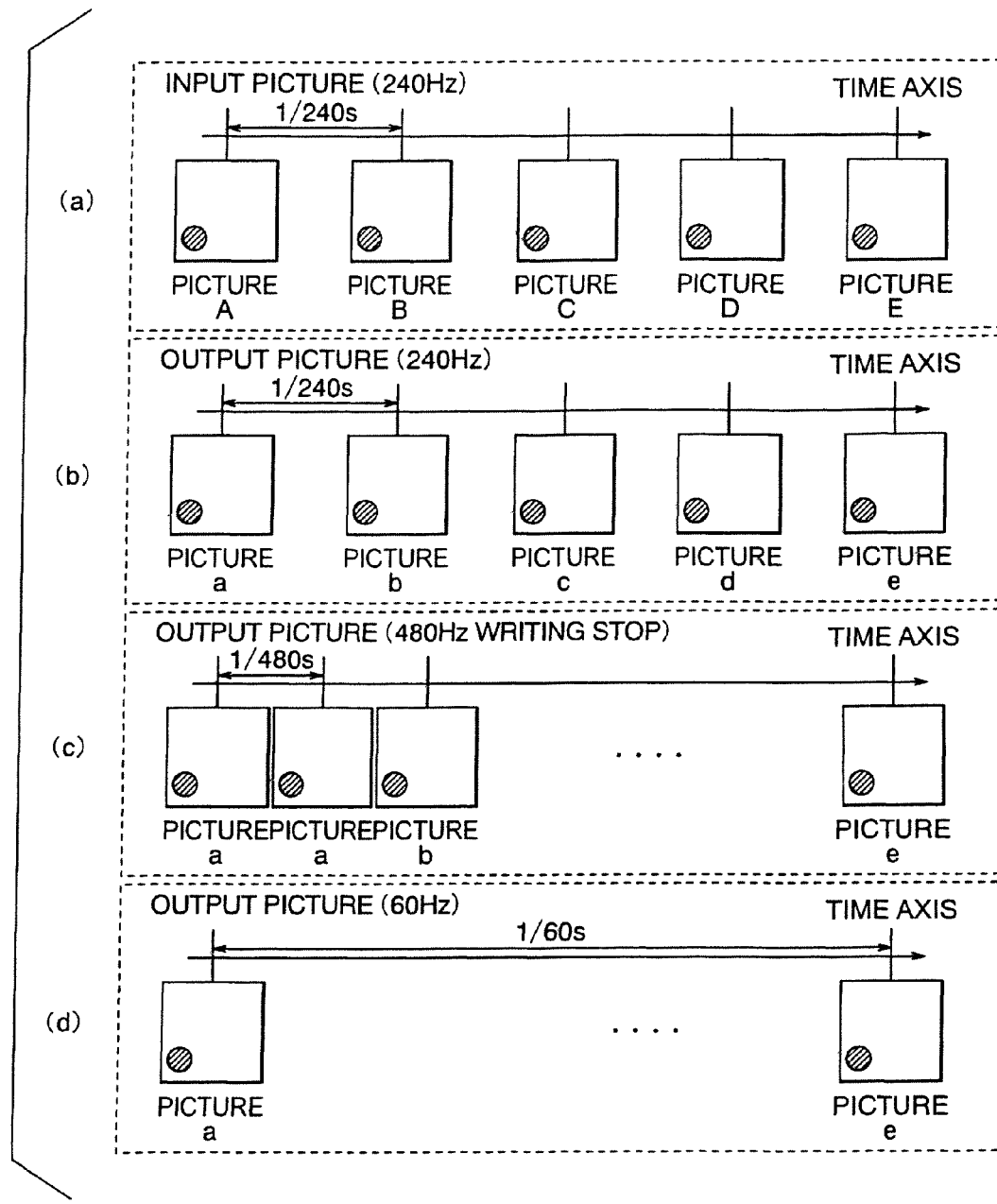
FIG. 22 is an illustration for explaining the production of an output frame picture according to a display system control signal in the first embodiment.

1) When the refresh rate of the input frame picture is equal to the refresh rate of the output frame picture, e.g., when the refresh rate of the input frame picture is 240 Hz and the refresh rate of the output frame picture is 240 Hz, input frame pictures A, B, C, D and E shown in FIG. 22(*a*) are directly outputted as output frame pictures a, b, c, d and e as shown in FIG. 22(*b*).

2) When the refresh rate of the output frame picture is higher than the refresh rate of the input frame picture, e.g., when the refresh rate of the input frame picture is 240 Hz and the refresh rate of the output frame picture is 480 Hz, the same picture is displayed between the output frame pictures a, b, c, d and d corresponding to the input frame pictures A, B, C, D and E as shown in FIG. 22(*c*) (e.g., the picture a is displayed between the output frame pictures a and b). Alternatively, the outputs of the output picture signal and the output synchronizing signal between pictures are stopped, and an output control signal (not shown) in the hold type display device is deactivated. Thus, for example, in an LCD, gate lines are not in ON state to prevent writing in pixels. At this time, the display state is the same as that shown in FIG. 22(*c*).

3) When the refresh rate of the input frame picture is higher than the refresh rate of the output frame picture, e.g., when the refresh rate of the input frame picture is 240 Hz and the refresh rate of the output frame picture is 60 Hz, the output frame pictures b, c and d corresponding to the input frame pictures B, C and D are thinned out to output picture signals as shown in FIG. 22(*d*).

As described above, according to this embodiment, output picture signals corresponding to the display device 50 can be produced from input picture signals, and output frame pictures can be produced in accordance with the fact that a display picture is a moving picture or a still picture, so that it is possible to improve the picture quality.

Second Embodiment

Figure 9:
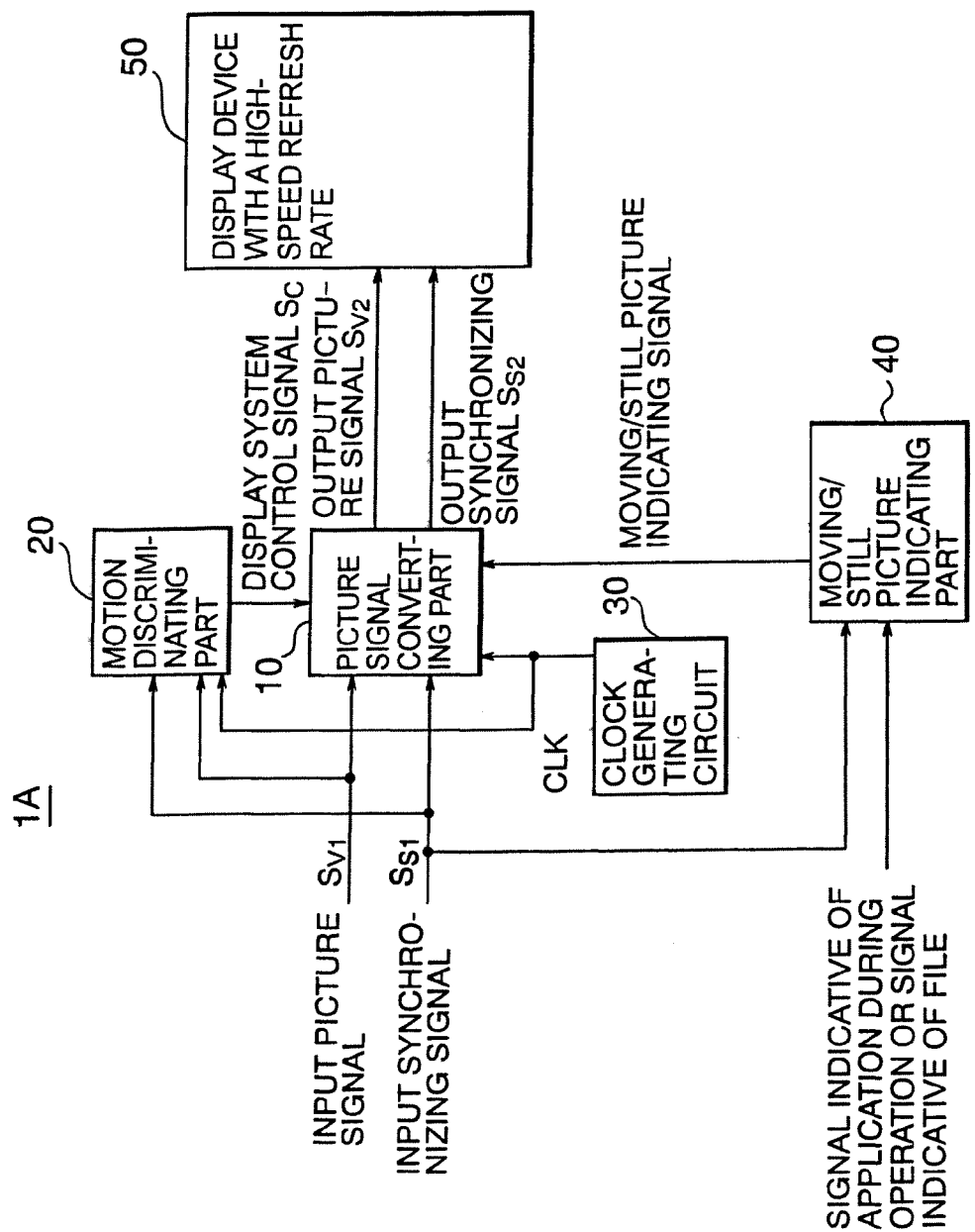
FIG. 9 is a block diagram showing the construction of the second embodiment of an image display system according to the present invention.
Figure 10:
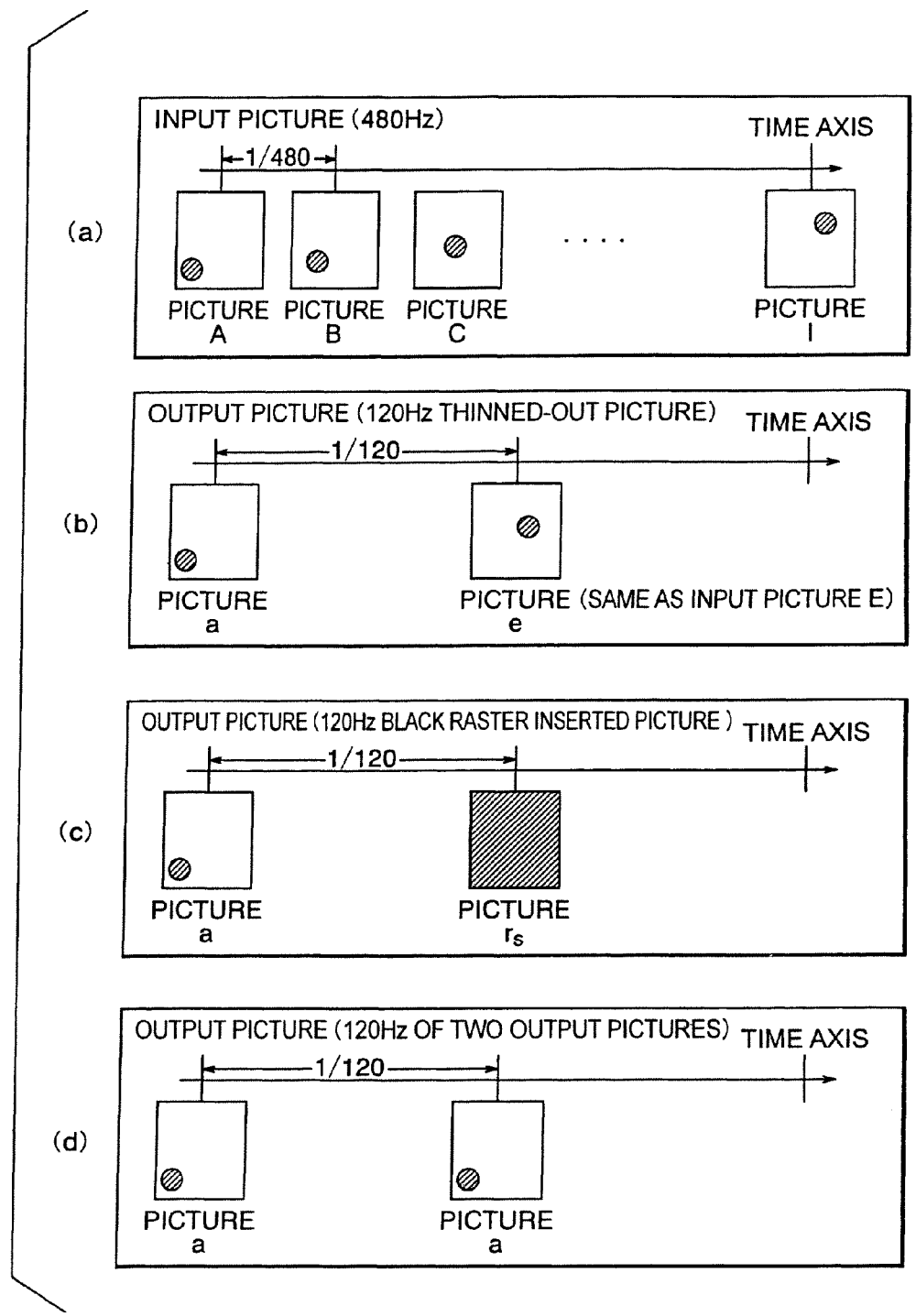
FIG. 10 is an illustration for explaining the production of an output frame picture according to a display system control signal and a moving picture/still picture indicating signal in the second embodiment.

Referring to FIGS. 9 and 10, the second embodiment of the present invention will be described below. FIG. 9 shows the construction of the second embodiment of an image display system according to the present invention. The image display system 1A in the second embodiment is the same as the image display system 1 in the first embodiment, except that a moving/still picture indicating part 40 is further provided. The moving/still picture indicating part 40 is designed to transmit a moving/still picture indicating signal, which indicates whether the kind of a display picture displayed on the display device 50 is a moving picture or a still picture, to the picture signal converting part 10.

The moving/still picture indicating part 40 takes a system for determining a picture signal by an input synchronizing signal (e.g., determination of NTSC (National Television System Committee) system or PAL (Phase Alternation by Line) system, HDTV (High Definition Television) system), or receiving a signal indicative of an operating application software (e.g., an application software for reproduction of moving pictures, an application software for reproduction of still pictures) or a signal indicative of a reproduced file (e.g., extension) to determine a moving/still picture by a correspondence table which is provided in the moving/still picture indicating part 40.

The moving/still picture indicating part 40 may basically serve to determine motion during a predetermined period of time similar to the motion discriminating part 20. However, there are some cases where a moving picture may be displayed during a longer period of time than a predetermined period of time for a processing carried out by the motion discriminating part 20, in some image sources. In such cases, it is determined that the display picture is a still picture in spite of a moving picture since the same picture is recorded in the input frame memory in the motion discriminating part 20. Thus, blurring may occurs on the moving picture in the hold type display device. Therefore, the picture signal converting part 10 is designed to receive a moving/still picture indicating signal, which indicates whether the display picture is a moving picture or a still picture, from the moving/still picture indicating part 40.

Referring to FIG. 8, the production of an output frame picture according to a display system control signal and a moving/still picture indicating signal in the picture signal converting part 10 in the second embodiment will be described below. It is herein assumed that the refresh rate of an input frame picture is 60 Hz and the refresh rate of an output frame picture is 480 Hz.

For example, if the display device 50 is an impulse type display device, when the moving/still picture indicating signal indicates a still picture and when the motion discriminating part 20 determines that the display picture is a rapid moving picture (e.g., when the whole screen is switched), an output picture is selected as shown in FIG. 8(*d*). When the motion discriminating part 20 determines that the display picture is a slow moving picture (e.g., when the screen is scrolled), an output picture is selected as shown in FIG. 8(*b*), and when the motion discriminating part 20 determines that the display picture is a still picture, an output picture is selected as shown in FIG. 8(*d*). On the other hand, when the moving/still picture indicating signal indicates a moving picture and when display picture is a rapid moving picture (e.g., when a moving object which moves rapidly exists), an output picture is selected as shown in FIG. 8(*b*), and when the motion discriminating part 20 determines that the display picture is a slow moving picture (e.g., when a moving object which moves slowly exists), an output picture is selected as shown in FIG. 8(*c*). If the motion discriminating part 20 determines that the display picture is a still picture, information thereon is ignored, and an output picture is selected as shown in FIG. 8(*c*). The reason why the output picture shown in FIG. 8(*c*) is selected is that no interpolated picture can be prepared. A system for determining the moving speed of the moving picture in the motion discriminating part 20 may be the same as that in the first embodiment. Alternatively, when the difference between information in an input frame memory, which has been most newly inputted, and those in other input frame memories is large, it may be determined that motion is rapid, and when the difference between information in the input frame memory, which has been most newly inputted, and the oldest input frame memory is small, it may be determined that motion is slow.

If a motion vector such as MPEG4 is used, it is possible to determine whether the motion of a moving picture is rapid or slow on the basis of the magnitude of the vector. Systems for interpolating pictures include a system for extracting a changing region and picture information after change from a motion vector in MPEG4 to replace the changing region with picture information in a frame memory (see Japanese Patent Laid-Open Publication No. 2000-284755), and an interpolation system (see Japanese Patent Laid-Open Publication No. 1995-107465). The detailed descriptions thereof are herein omitted. The entire contents of these references are incorporated by references.

Referring to FIG. 19, a case where the display device 50 is a hold type display device will be described below. In this case, it is assumed that the refresh rate of an input frame picture is 480 Hz and the refresh rate of an output frame picture is 120 Hz (see FIG. 10).

When the moving/still picture indicating signal indicates a still picture, an output picture is selected as shown in FIG. 10(*d*). When the moving/still picture indicating signal indicates a moving picture and when the motion discriminating part 20 determines that the display picture is a rapid moving picture (e.g., when a moving object which moves rapidly exists), an output picture in which pictures are thinned out is selected as shown in FIG. 10(*b*). When the motion discriminating part 20 determines that the display picture is a slow moving picture (e.g., when a moving object which moves slowly exists), an output picture in which a black raster picture is inserted is selected as shown in FIG. 10(*c*). when the moving/still picture indicating signal indicates a moving picture and when the motion discriminating part 20 determines that the display picture is a still picture, information thereon is ignored, and the output picture shown in FIG. 10(c) is selected.

When the moving/still picture indicating signal indicates a still picture or when the motion discriminating part 20 determines that the display picture is a still picture, the characteristics of the hold type display device may be utilized for outputting the picture of the first output frame memory 181, and then, the output may be stopped. Also by this method, it is possible to provide a picture having no flicker.

As described above, according to the image display system in the second embodiment, output frame pictures are outputted in accordance with the fact that a display picture is a rapid moving picture, a slow moving picture or a still picture, so that it is possible to improve the picture quality.

In addition, by providing the moving/still picture indicating part 40, the hold type display device can prevent blurring from occurring on a moving picture even if the moving picture is displayed for a longer period of time than a predetermined period of time for a processing carried out in the motion discriminating part 20, so that it is possible to improve the picture quality.

Third Embodiment

Figure 11:
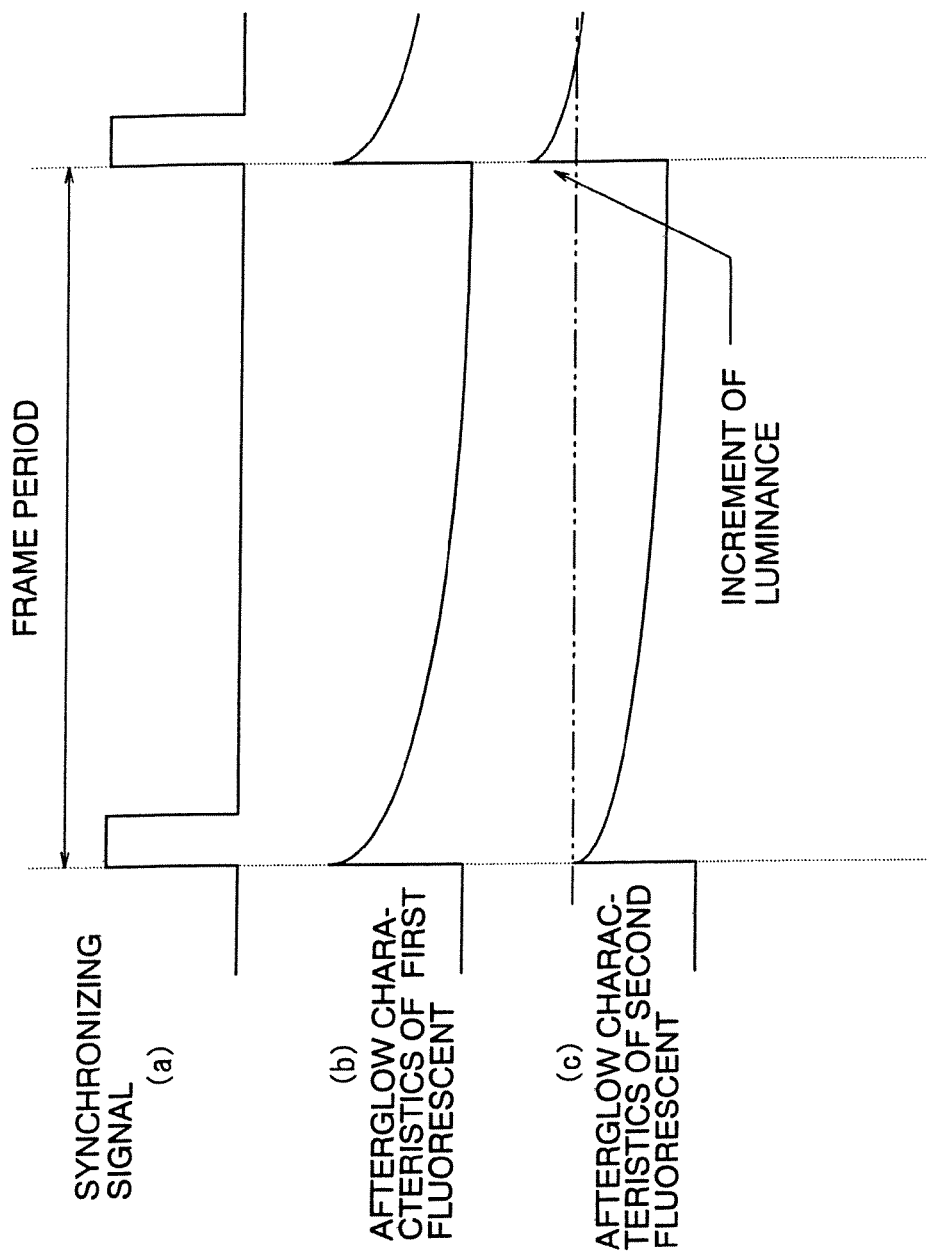
FIG. 11 is an illustration for explaining the characteristics of the third embodiment of a display device with a high-speed refresh rate according to the present invention.

Referring to FIG. 11, the third embodiment of an image display system according to the present invention will be described below. In the third embodiment, the image display system is the same as the image display system in the first or second embodiment, except that the display device with a high-speed refresh rate 50 comprises a CRT having a fluorescent substance or an impulse type display device such as FED.

This embodiment is characterized in that when output pictures shown in FIGS. 8(c), 8(d) and 10(c) are displayed, the output of an output picture signal $S_{v2}$ and an output synchronizing signal is stopped to provide a non-emission period in place of the output of a black raster picture. In the display device using a fluorescent substance, the relationship between the afterglow time of the fluorescent substance and a frame period should be noted. As shown in FIG. 11(b), a first fluorescent substance having a shorter afterglow time than the frame period is used. When a second fluorescent substance having a longer afterglow time than the frame period is used, there are some cases where the screen is gradually brightening as shown in FIG. 11(c), so that it is required to limit the maximum driving voltage Vdrv of the display device (the maximum variation in cathode voltage and cut-off voltage).

There may also be a problem in that the brightness of the screen is different by changing the display system. For example, in FIG. 8, the brightness of the output pictures shown in FIG. 8(d) is double as large as the brightness of the output pictures shown in FIG. 8(c), and the brightness of the output picture shown in FIG. 8(c) is eight times as large as the brightness of the output pictures shown in FIG. 8(c). Therefore, the mean brightness of the screen must be equal to each other to some extent. This is particularly important when the display system is frequently changed, and the difference between the luminance values of the respective display systems must be about 1%. In the display device with a high-speed refresh rate using CRT, both of contrast and color purity can be adjusted by controlling the maximum driving voltage Vdrv and the cut-off voltage Ek-co for beams. In the FED, these can be adjusted by the anode voltage. These set values may be previously recorded in the memory of the display device with a high-speed refresh rate, and read in accordance with a display system control signal from the motion discriminating part 20. It is also preferred that picture signals may be changed in accordance with the display system instead of changing the set values of the display device. For example, the output picture signals shown in FIG. 8(d) may be changed so that its luminance value is a half of that of output picture signals shown in FIG. 8(c).

Also in the third embodiment, it is possible to improve the picture quality.

Fourth Embodiment

Figure 12:
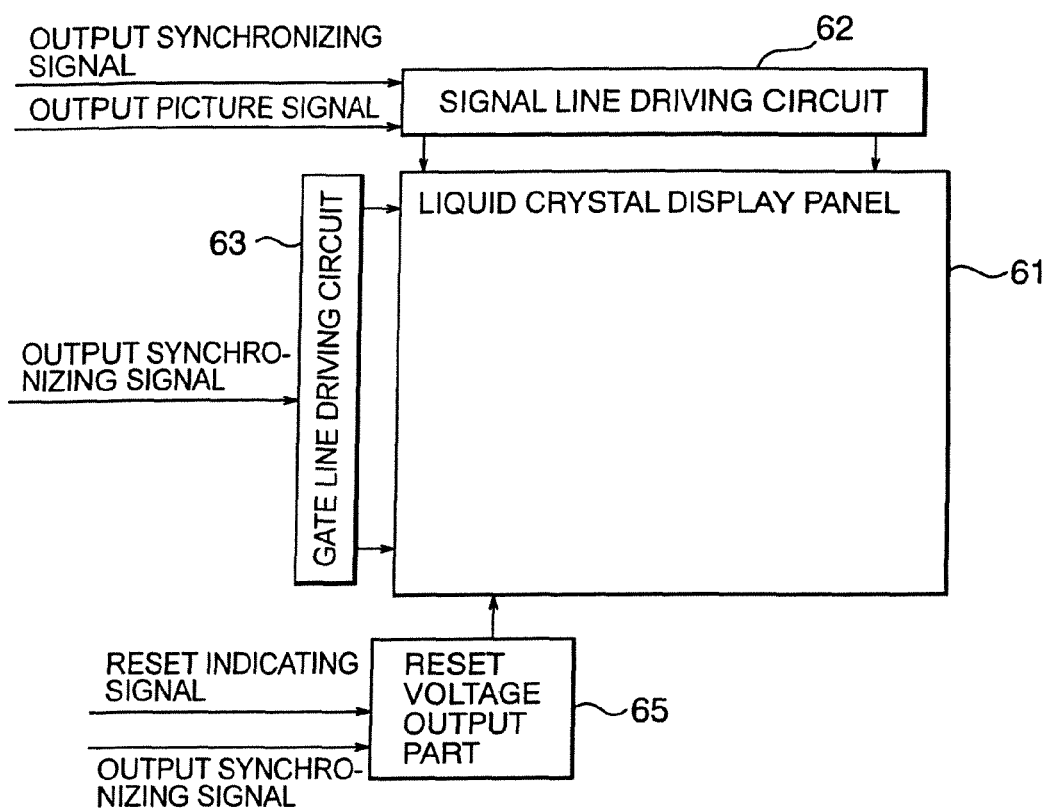
FIG. 12 is a block diagram showing the construction of the fourth embodiment of a display device with a high-speed refresh rate according to the present invention.

Referring to FIG. 12, the fourth embodiment of an image display system according to the present invention will be described below. In the fourth embodiment, the image display system is the same as the image display system in the first or second embodiment, except that the display device with a high-speed refresh rate is a hold type display device, such as an LCD or an ELD with memory elements.

In this embodiment, when output pictures shown in FIGS. 8(c), 8(d) and 10(c) are displayed, a black raster picture is outputted in the case of a frame picture to which the black raster picture is to be outputted.

However, the ELD used herein has memory elements capable of recording therein a signal to the respective pixel electrode every pixel, and is cited as an example of a display device wherein display information is not rewritten until a next signal to the respective pixel electrode is written again although this principle is different from that of LCDs. This embodiment will be described using an LCD which is a typical example of a hold type. Liquid crystal materials for use in LCDs include twist nematic liquid crystals, ferroelectric liquid crystals (which will be hereinafter referred to as FLCs), and optically compensated bend modes (which will be hereinafter referred to as OCBs) which aim at a fast response. In particular, FLCs and OCBs can carry out a high-speed refresh display due to their fast response. As shown in the figure, the image display system in this embodiment comprises a signal line driving circuit 62 for supplying signals to the respective pixel electrodes of liquid crystal cells, a reset voltage output part 65 capable of resetting (making a black display state) all of pixels on the same gate line as a gate line driving circuit 63 for driving gate lines which are connected to the respective pixel electrodes in row directions via switching elements for writing every row, and a liquid crystal display panel 61. Since the array construction of the liquid crystal display panel 61 is well known, the detailed description thereof is omitted. An output picture signal and an output synchronizing signal are inputted to the signal line driving circuit 62, and signals are simultaneously outputted to pixels in row directions in synchronism with the synchronizing signal. The gate driving circuit 63 also receives the output synchronizing signal to sequentially scan on gate lines in column directions. The liquid crystal display device uses a display system for continuing to hold the last picture until the next gate line is scanned. For example, when output pictures shown in FIGS. 8(c) and 8(d) are displayed, a black raster picture may be inputted as an output picture signal, or a reset indicating signal may be inputted to the reset voltage output part 65 from the output control switch 18 in synchronism with the output synchronizing signal to display black with respect to all of pixels. In this case, there are a method for sequentially scanning gate lines to sequentially change the display to a black raster display every one line, and a method for simultaneously scanning all of gate lines from the gate line driving circuit 63 to simultaneously change the display to a black display with respect to all of pixels.

Although there may also be a problem in that the brightness of the screen is different by changing the display system, another light valve (which may be a liquid crystal panel) capable of varying the luminance of a back light in accordance with a frame frequency or of varying transmittance can be arranged on the front face of the liquid crystal panel. Also in this case, similar to the third embodiment, set values are previously recorded in the memory of the display device with a high-speed refresh rate, and the luminance of the back light or a voltage applied to the other light valve is controlled in accordance with the display system control signal from the motion discriminating part.

It is also preferred that picture signals may be changed in accordance with the display system instead of changing the set values of the display device. For example, the output picture signals shown in FIG. 8(d) may be changed so that its luminance value is a half of that of output picture signals shown in FIG. 8(c).

Also in the fourth embodiment, it is possible to improve the picture quality.

Fifth Embodiment

Figure 13:
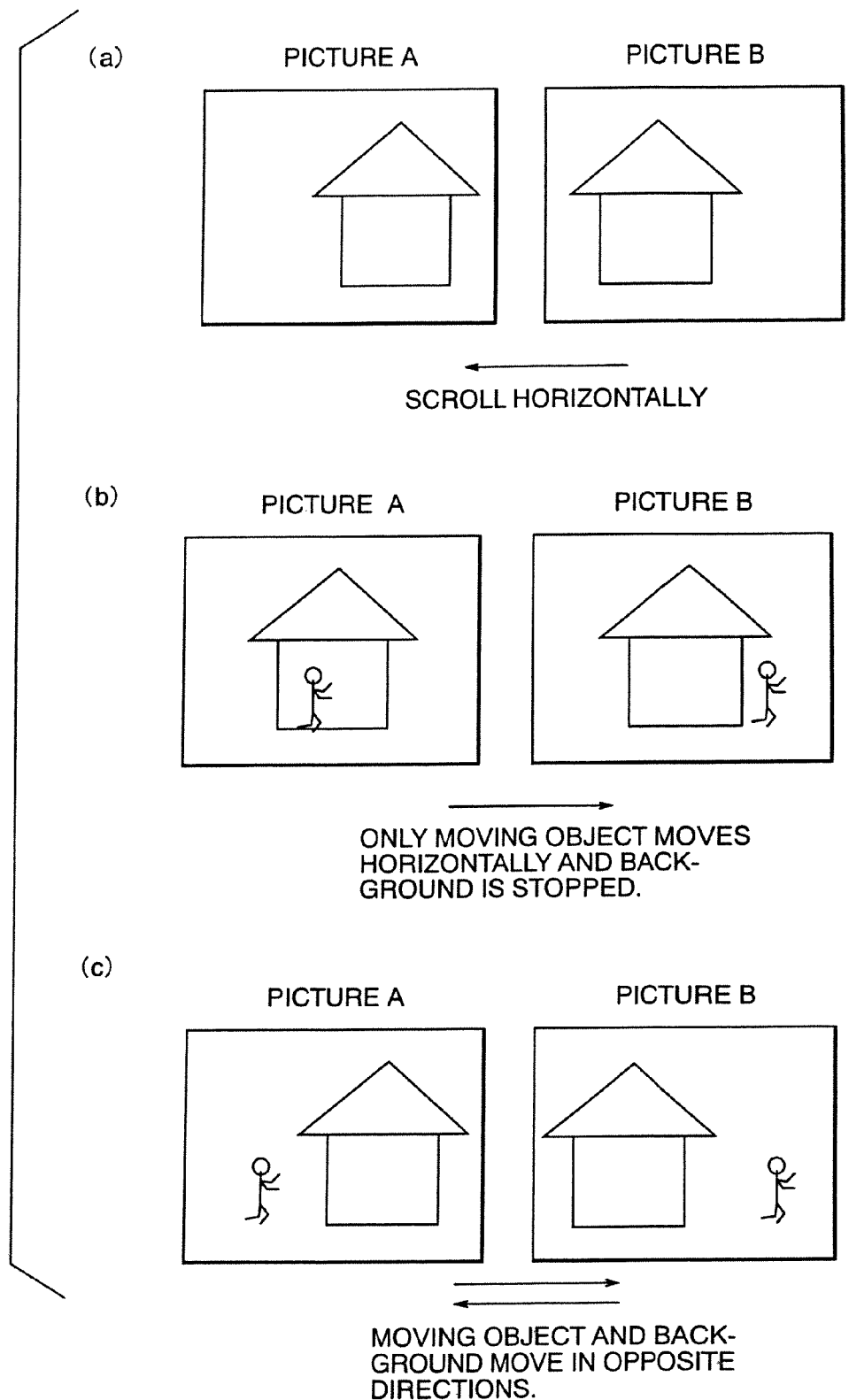
FIG. 13 is an illustration showing an example where effects are particularly obtained by the fifth embodiment of the present invention.

Referring to FIG. 13, the fifth embodiment of an image display system according to the present invention will be described below. In the image display system in the fifth embodiment, the frame frequency of the display device with a high-speed refresh rate is set to be 240 Hz or higher in the image display system in the first or second embodiment. According to the inventor's experiments, it was confirmed that it was possible to improve the picture quality in most of moving pictures by setting the frame frequency of the display device with a high-speed refresh rate to be 240 Hz or higher.

For example, in the case of a so-called scrolled picture wherein the whole screen moves as shown in FIG. 13(a), a picture wherein a rapid moving object (a person in the figure) exists in a stopped background (a house in the figure) as shown in FIG. 13(b), and a picture wherein the moving speed of a moving object relatively increases since the background and the moving object move in opposite directions as shown in FIG. 13(c), it was confirmed that it was possible to make the picture quality of the moving picture smooth to improve the picture jumping phenomenon by setting the frame frequency to be 240 Hz or higher. Therefore, clear pictures picked up by computer graphics or high-speed shutter video cameras can also be displayed without deterioration of the picture quality.

In clear pictures picked up by computer graphics or high-speed shutter video cameras, the contours of the objects are often clear. That is, in an image pick-up method using a usual camera, the object often moves while the shutter of the camera is open, so that the contours of the object in one frame picture often blur. Therefore, even if an interpolated picture is produced by this system, effects are often difficult to appear.

Therefore, the spatial frequencies of one frame picture are obtained by the Fourier transformation. When many high spatial frequencies are included, the refresh rate of the output frame picture is set to be high, and when high spatial frequencies are hardly included, the refresh rate of the output frame picture is set to be low.

Since the picture jumping phenomenon does not only depend on the moving speed of the object, but it also depend on the spatial frequency, a system for producing an interpolated picture is preferably used when many high spatial frequencies are included, and a system for producing a black raster picture is preferably used when high spatial frequencies are hardly included.

Sixth Embodiment

Figure 14:
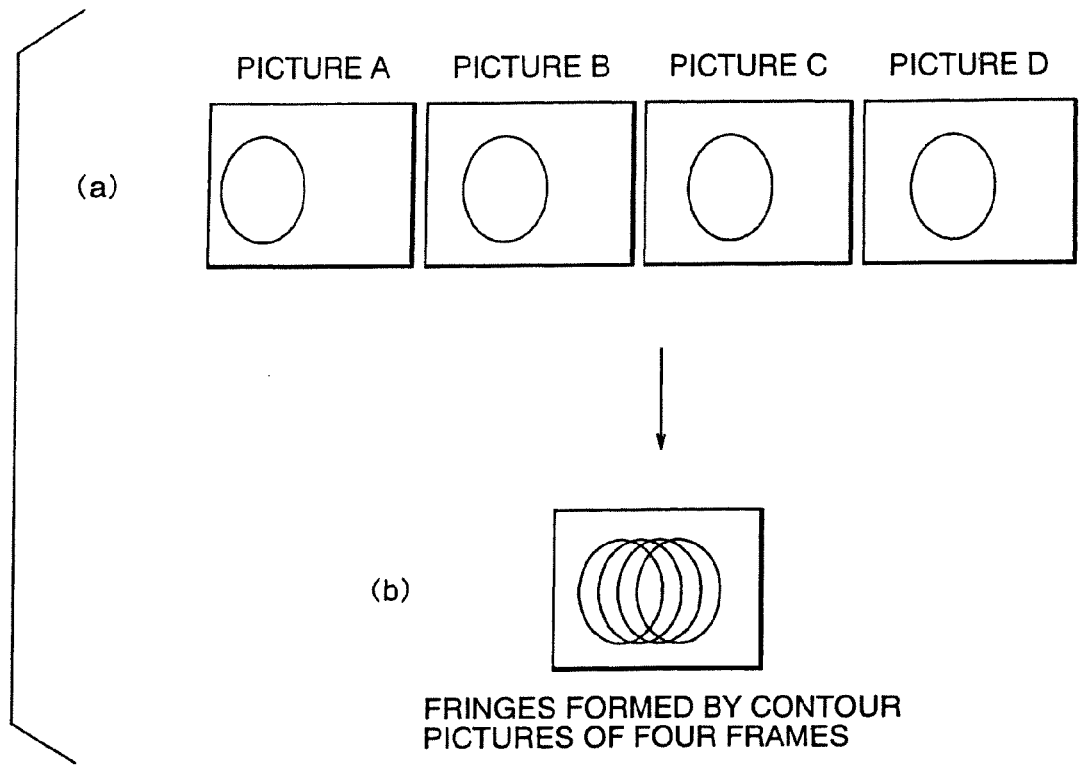
FIG. 14 is an illustration for explaining a system for deriving the moving speed of a moving object in the sixth embodiment of the present invention.
Figure 15:
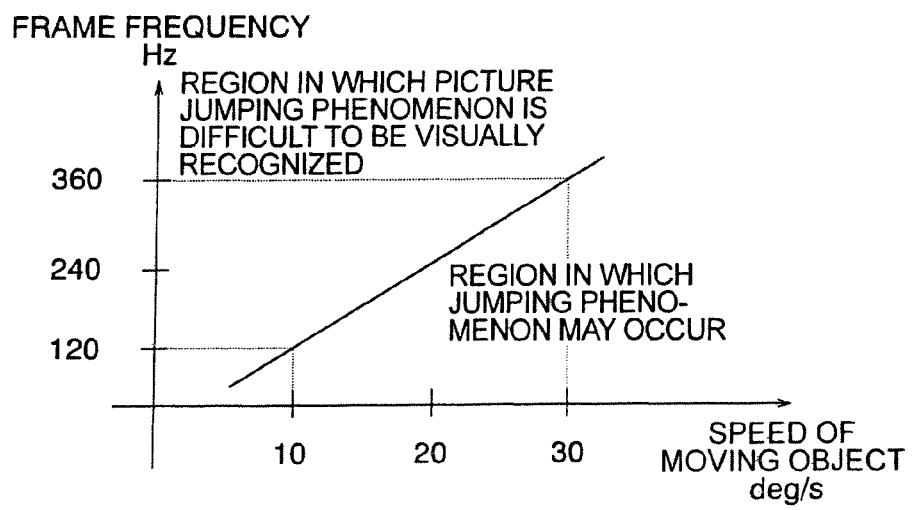
FIG. 15 is a graph showing the relationship between the speed of a moving object and a frame frequency in a display picture in which the picture jumping phenomenon does not occur.
Figure 16:
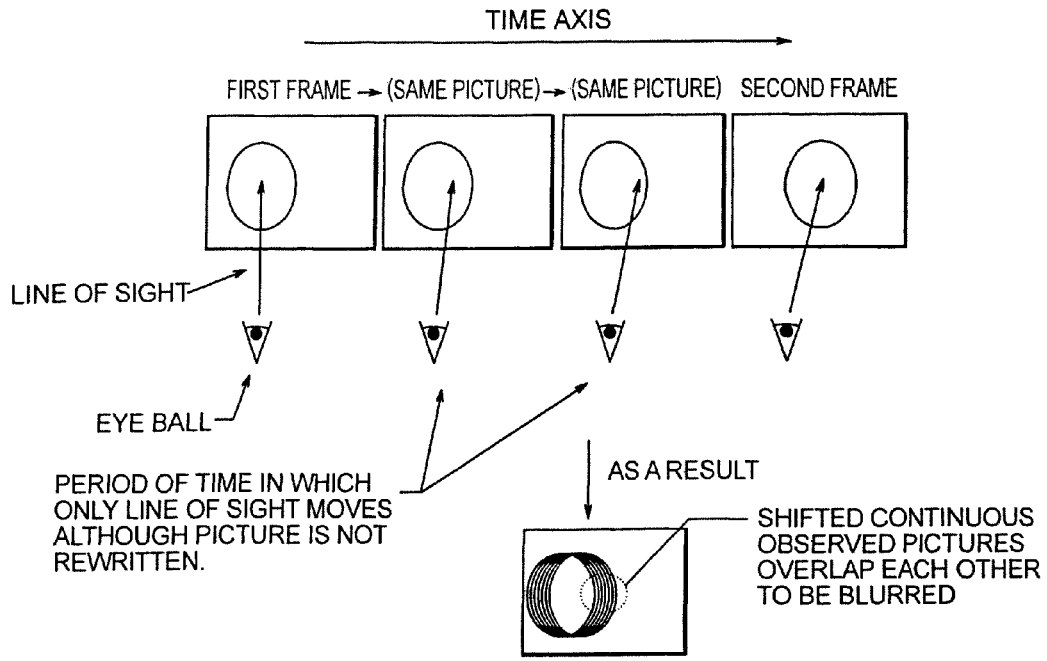
FIG. 16 is an illustration for explaining the blurred phenomenon in a conventional hold type display device.
Figure 17:
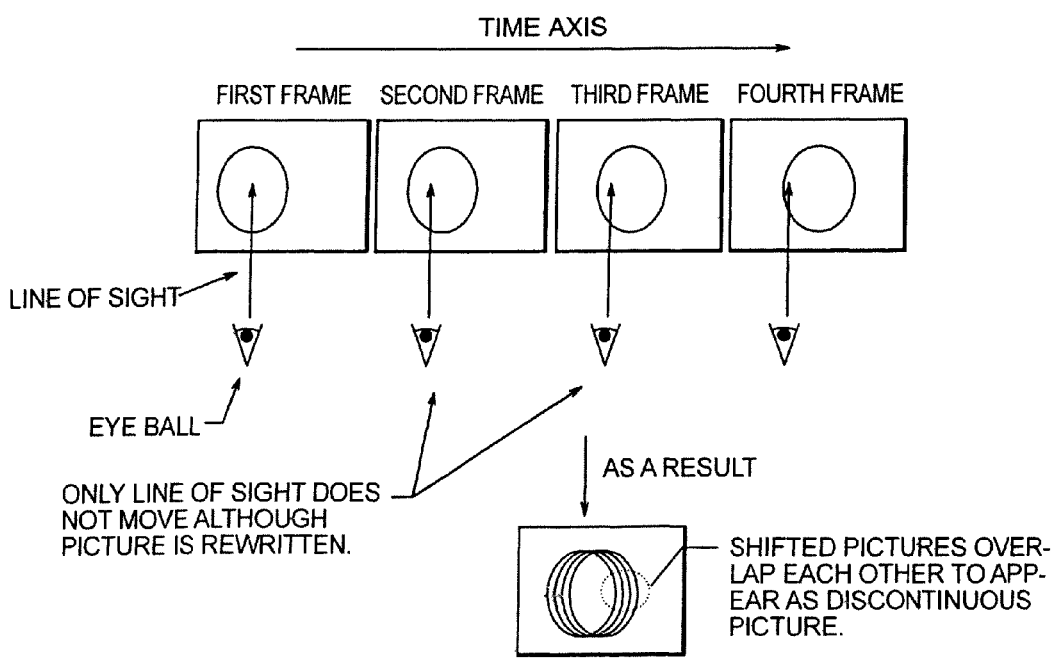
FIG. 17 is an illustration for explaining the display discontinuous phenomenon in a conventional hold type display device.
Figure 18:
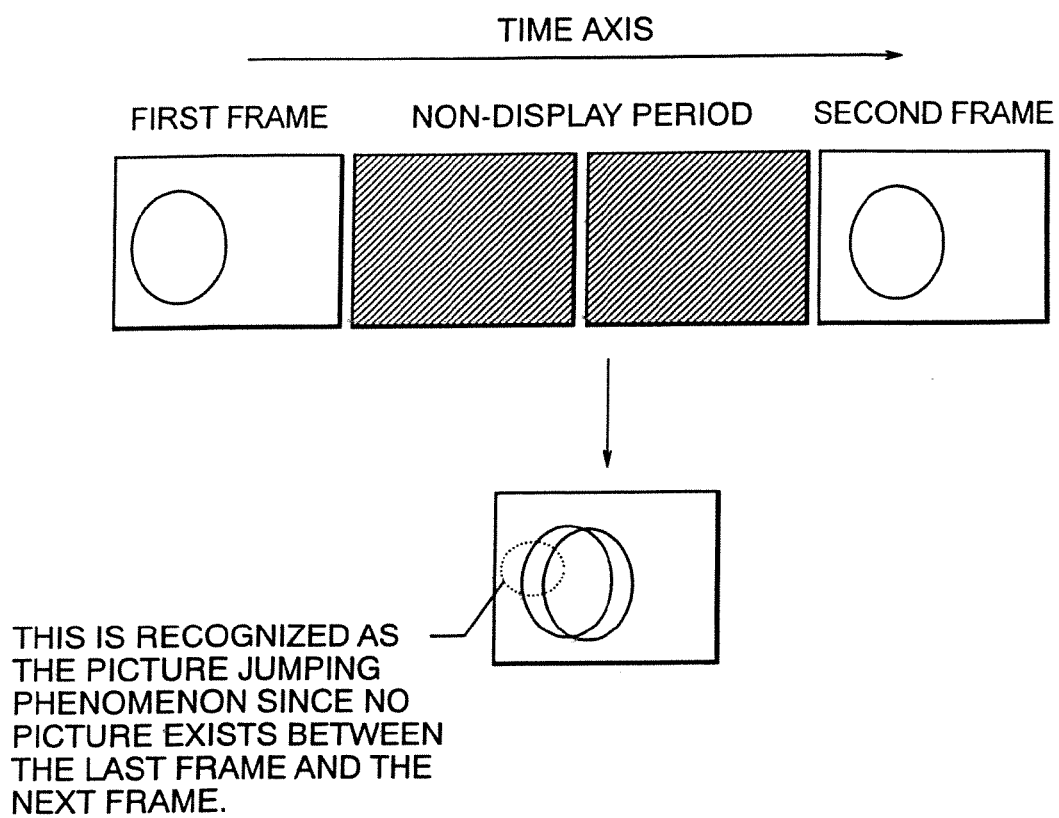
FIG. 18 is an illustration for explaining the picture jumping phenomenon in a conventional impulse type display device.
Figure 23:
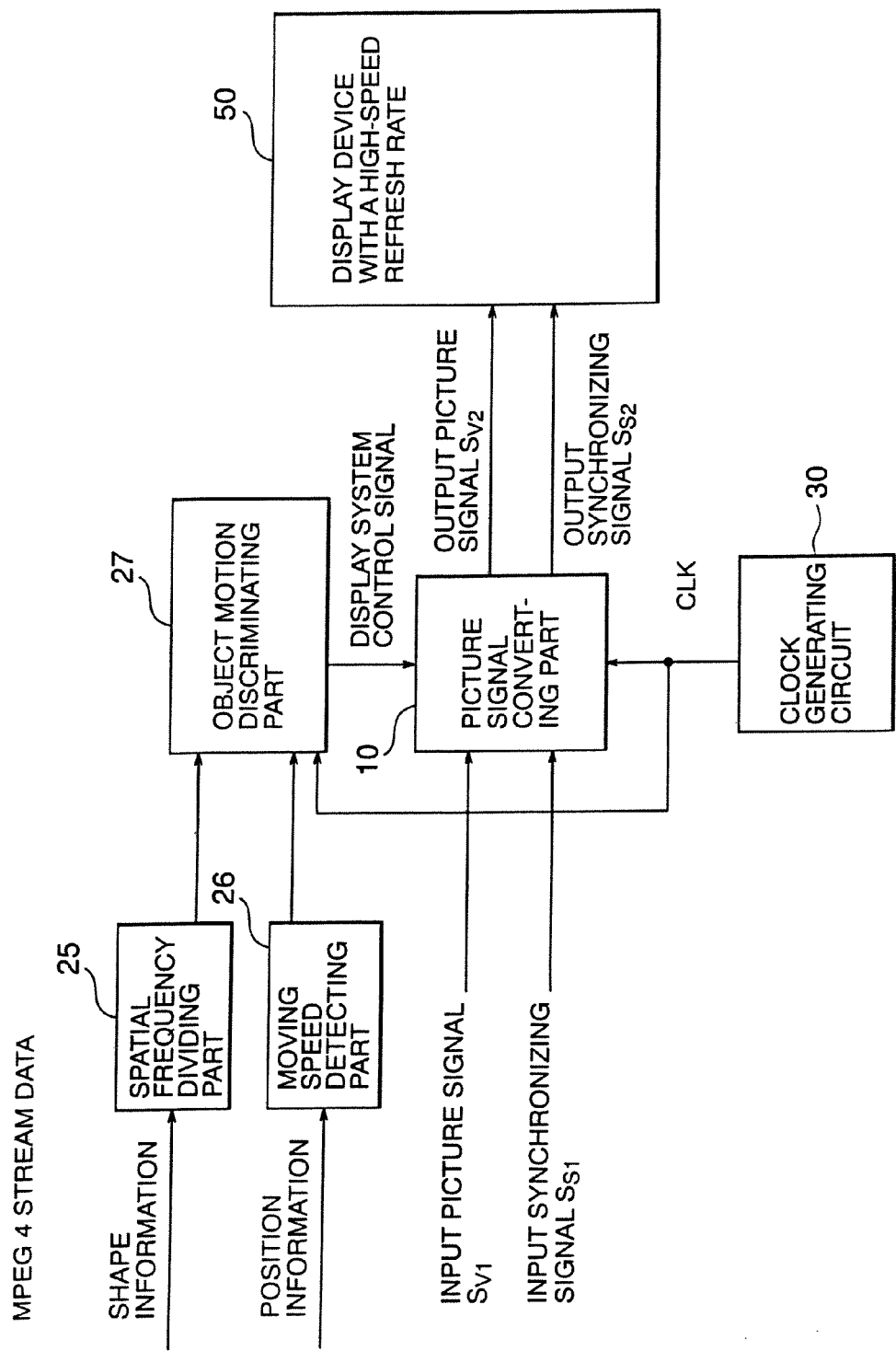
FIG. 23 is a block diagram showing the construction of the sixth embodiment of the present invention.

Referring to FIGS. 14, 15 and 23, the sixth embodiment of an image display system according to the present invention will be described below. In the image display system in the sixth embodiment, the frame frequency of the display device with a high-speed refresh rate 50 is variable in accordance with the moving speed of a moving object, which is included in picture information, in the image display system in the first or second embodiment. As described above, the moving speed of the moving object can be calculated by the processing in the motion discriminating part 20, e.g., by the scalar quantity of a motion vector using MPEG4.

For example, as shown in FIG. 23, the shape information and position information of an object are inputted to the system by the contents base coding of MPEG4. The basis of the shape information is used for dividing the spatial frequency by the Fourier transformation in a spatial frequency dividing part 25 to obtain a spectrum every spatial frequency of the object, and the position information is used for obtaining the moving distance, i.e., the moving speed, of the object by the moving object detecting part 26. The spectrum and the moving speed are inputted to an object motion discriminating part 27 as an object motion indicating signal. Since the object motion indicating signal has the same function as that of the display system control signal shown in FIG. 1, it is also expressed as a display system control signal in FIG. 23.

A processing method in an object motion discriminating will be described below. For example, when a spectrum of 3 cpd (cycle per degree) of an object has −20 dB or less, a system for inserting a black raster picture is used since it is difficult to visually recognize the picture jumping phenomenon at a moving object speed of 10 deg/s, and when the spectrum has −20 dB or higher, a system for producing an interpolated picture is used. That is, even if the moving speed is the same, when a spectrum of 3 cpd of an object has −20 dB or less, the processing method, which is used when it is determined that the display picture is a slow moving picture, is used, and when the spectrum has −20 dB or higher, the processing method, which is used when it is determined that the display picture is a rapid moving picture, is used. For example, when the above described spectrum of 3 cpd has −10 dB or less, a system for inserting a black raster picture is used since it is difficult to visually recognize the picture jumping phenomenon at a moving object speed of 20 deg/s, and when the spectrum has −10 dB or higher, a system for producing an interpolated picture is used. Similarly, even if the moving speed is the same, when a spectrum of 3 cpd of an object has −10 dB or less, the processing method, which is used when it is determined that the display picture is a slow moving picture, is used, and when the spectrum has −10 dB or higher, the processing method, which is used when it is determined that the display picture is a rapid moving picture, is used. The discriminating method based on numeric values can be carried out by discriminating the motion of the object on the basis of a discrimination threshold of visual temporal-spatial frequency characteristics. Alternatively, the discrimination can be carried out from a plurality of numerical values without limiting the kind of numerical values to one kind. Thus, the system has the function of selecting the interpolated picture or black raster picture as the output frame picture by the spatial frequency of one frame picture, so that the calculation quantity in this system can be optimized to decrease electric power consumption.

The moving speed of the moving object can be obtained by extracting contours, obtaining the spatial frequency of fringes formed by a contour portion during a certain period of time, and obtaining a discrimination threshold from a visual time-spatial frequency, in place of the calculation of the moving speed of the moving object by the scalar quantity of a motion vector using MPEG4. For example, in this system, the contours of a round moving object are extracted as shown in FIG. 14 to obtain a spatial frequency which is formed by contours of 3 frames (corresponding to 50 ms at a frame frequency of 60 Hz) (see FIG. 14(b)). In the display system of a frame frequency of 60 Hz, if the moving object moves at 20 deg/s, the spatial frequency c of fringes formed by one side contour is obtained by the following expression.

$$c=3/(20\times(3/60))=3cpd \quad (1)$$

The spatial frequency of 3 cpd is very easy to be visually recognized from visual temporal-spatial frequency characteristics, so that the picture quality deteriorates as a picture jumping. Therefore, if the relationship between the speed of the moving object and the frame frequency is obtained so that the spatial frequency thus obtained is, e.g., 12 cpd or higher, it is divided by a straight line into a region, in which it is difficult to visually recognize the picture jumping phenomenon, and a region in which the picture jumping phenomenon may occur. By using this relationship, the display picture is displayed by changing the frame frequency in accordance with the moving object included in picture information.

Since pictures displayed by television generally include many moving bodies which move at 10 deg/s, the frame frequency must be 120 Hz or higher. Since rapidly moving screens for sports or the like include many moving bodies which move at 20 deg/s, the frame frequency is preferably 240 Hz or higher.

As described above, also in the sixth embodiment, it is possible to prevent the deterioration of the picture quality.

As described above, according to the present invention, it is possible to prevent the deterioration of the picture quality.

According to the inventor's experiment, it was confirmed that the movement of an object was displayed at intervals when a picture was displayed on a monitor capable of rewriting at a high frame frequency of 480 Hz, by a system in which the picture was displayed for a period of one frame and was not displayed for a period of seven frames. On the other hand, when pictures were displayed on all of frames, the moving object having slight blurring was observed substantially similar to the real world. For example, the above described situation observed at a fixation point is a case where character information is fed independently of picture information displayed on a digital television and where characters displayed on the background image are observed, or the like. However, according to the present invention, these disadvantages can be improved.

While the present invention has been disclosed in terms of the embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An image display system comprising:
   a display device configured to display a picture while changing the picture every frame picture;
   an image processing device comprising a picture signal converting part configured to convert an input picture signal, which is a picture signal for a picture to be displayed on a display device configured to display a picture while changing the picture every frame picture, and an input synchronizing signal, which is synchronized with the input picture signal, into an output picture signal, which is a picture signal for a picture suitable for the display for the display device, and an output synchronizing signal which is synchronized with the output picture signal, on the basis of picture information which indicates whether the picture to be displayed on the display device is a moving picture or a still picture; and
   a motion discriminating part configured to discriminate whether the picture to be displayed is a moving picture or a still picture,
   wherein the picture signal converting part comprises:
   a device discriminating part configured to discriminate whether a display device is an impulse type device or not;
   an input frame memory configured to record an input frame picture;
   an input switching part configured to transmit an input frame picture to be displayed, to the input frame memory on the basis of the input picture signal and the input synchronizing signal;
   a black raster picture producing part configured to produce or store a black raster picture;
   a picture converting part configured to produce output frame pictures from input frame pictures, which have been recorded in the input frame memory, by producing an interpolated picture or inserting a black raster picture or thinning out the frame pictures, between frame pictures corresponding to the picture information, on the basis of the picture information and the input synchronizing signal and the output synchronizing signal;
   an output frame memory configured to record therein the output frame pictures; and
   an output control switching part configured to take the output picture signal and the output synchronizing signal out of the output frame pictures, which have been recorded in the output frame memory, to transmit the signals to the display device,
   wherein the picture signal converting part produces the output frame pictures from the input frame pictures on the basis of a moving or still picture indicating signal, which indicates whether the kind of a picture to be displayed on the display device is a moving picture or a still picture, and the output of the motion discriminating part, and
   wherein the motion discriminating part incorporates input frame pictures to be displayed, at regular intervals on the basis of the input picture signal and input synchronizing signal, obtains the correlation between two input frame pictures which have been continuously incorporated, and discriminates whether the input frame picture to be displayed is a moving picture or a still picture on the basis of the correlation result,
   wherein when it is determined that the picture to be displayed is a moving picture, the motion discriminating part determines whether the moving picture is in a first state in which the motion of a moving object in the moving picture is rapid, or in a second state in which the moving speed of the moving object is slower than that in the first state, on the basis of the correlation, and wherein when it is discriminated that the display device is the impulse type display device, when it is discriminated that the picture to be displayed is a moving picture, and when it is determined that the moving speed of the moving object in the moving picture is in the second state, the picture converting part compares the refresh rate of the input frame pictures with the refresh rate of the output frame pictures, outputs the input frame pictures as the output frame picture, when the refresh rate of the input frame pictures is equal to the refresh rate of the output frame pictures, stop the output of signals between the input frame pictures, or inserts and outputs a black raster picture, when the refresh rate of the output frame pictures is higher than the refresh rate of the input frame pictures, and thins out the input frame pictures to produce and output the output frame pictures, when the refresh rate of the output frame pictures is lower than the refresh rate of the input frame pictures.

* * * * *